United States Patent
Cai et al.

(10) Patent No.: US 11,251,620 B2
(45) Date of Patent: Feb. 15, 2022

(54) MICRO-GRID SITE PREDICTIVE CONTROL FOR MULTIPOWER RESOURCE MANAGEMENT WITH MACHINE LEARNING

(71) Applicant: Caterpillar Inc., Peoria, IL (US)

(72) Inventors: Zhijun Cai, Dunlap, IL (US); Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 31 days.

(21) Appl. No.: 16/808,181

(22) Filed: Mar. 3, 2020

(65) Prior Publication Data

US 2021/0281077 A1 Sep. 9, 2021

(51) Int. Cl.
*H02J 3/38* (2006.01)
*H02J 3/00* (2006.01)
(Continued)

(52) U.S. Cl.
CPC .......... *H02J 3/381* (2013.01); *G05B 13/0265* (2013.01); *G05B 13/048* (2013.01); *H02J 3/004* (2020.01); *H02J 3/32* (2013.01); *G01W 1/10* (2013.01); *H02J 2203/20* (2020.01); *H02J 2300/24* (2020.01)

(58) Field of Classification Search
CPC .... H02J 3/381; H02J 3/32; H02J 3/004; H02J 2300/24; H02J 2203/20; G05B 13/0265; G05B 13/048; G01W 1/10
See application file for complete search history.

(56) References Cited

U.S. PATENT DOCUMENTS

| 9,244,444 B2 * | 1/2016 | Carty | G05F 1/66 |
| 9,438,041 B2 * | 9/2016 | Roy | G06Q 50/06 |

(Continued)

FOREIGN PATENT DOCUMENTS

| CN | 103996075 A | 8/2014 |
| CN | 107039975 A | 8/2017 |

(Continued)

OTHER PUBLICATIONS

Spyros Theocharides et al, "Short-Term Photovoltaic Power Forecasting Based on Artificial Neural Networks: A Numerical Weather Prediction-Free Approach". article, Sep. 24, 2018, Munich, Germany.

(Continued)

*Primary Examiner* — Ziaul Karim
(74) *Attorney, Agent, or Firm* — Harrity & Harrity LLP

(57) ABSTRACT

A device may receive a power demand for a load and a weather forecast for a time period. The device may determine a first supply of power available from a photo-voltaic (PV) installation for the time period based on the weather forecast. The device may determine a power deficit for the time period based on the power demand and the first supply of power. The device may determine a first cost associated with utilizing a second supply of power available from a battery and a second cost associated with utilizing a third supply of power available from an engine for the time period. The device may determine a power source to overcome the power deficit based on the first cost and the second cost and may cause the PV installation and the power source to supply power to satisfy the power demand for the load.

20 Claims, 11 Drawing Sheets

(51) Int. Cl.
    *G05B 13/02*     (2006.01)
    *G05B 13/04*     (2006.01)
    *H02J 3/32*     (2006.01)
    *G01W 1/10*     (2006.01)

(56) References Cited

U.S. PATENT DOCUMENTS

| | | |
|---|---|---|
| 10,275,842 B2 | 4/2019 | Lee et al. |
| 2009/0319090 A1 | 12/2009 | Dillon |
| 2014/0200723 A1* | 7/2014 | Roy ................ G06Q 50/06 700/291 |
| 2015/0326015 A1 | 11/2015 | Steven |
| 2018/0196456 A1* | 7/2018 | ElBsat ............. G06Q 50/06 |
| 2019/0036341 A1* | 1/2019 | Asghari ............ H02J 3/383 |
| 2019/0372345 A1* | 12/2019 | Bain ............. G06Q 30/0601 |
| 2020/0244071 A1* | 7/2020 | Smith ............... H02J 3/322 |

FOREIGN PATENT DOCUMENTS

| | | |
|---|---|---|
| WO | 2006132760 | 12/2006 |
| WO | 2018129829 A1 | 7/2018 |

OTHER PUBLICATIONS

Extended European Search Report for International Patent Appln No. 21157250.8-1202, dated Jul. 8, 2021 (149 pgs).

\* cited by examiner

MICRO-GRID SITE PREDICTIVE CONTROL FOR MULTIPOWER RESOURCE MANAGEMENT WITH MACHINE LEARNING

TECHNICAL FIELD

The present disclosure relates generally to multi-power resource management and, for example, to micro-grid site predictive control for multi-power resource management with machine learning.

BACKGROUND

A plurality of power resources may be used in various situations to provide energy to a load when a single power resource is not sufficient to provide energy to the load. The load may be an electrical load in a power system such as, for example, a domestic load, a commercial load, an industrial load, an agriculture load, and/or the like. The load may be one or more devices that consumes electrical energy in the form of current and transforms it into another form such as, for example, heat, light, work, and/or the like. For example, a photo-voltaic (PV) installation, a battery, and/or an engine may be configured to provide electrical energy to a load that requires more power than the PV installation can output. An optimization scheme associated with the power resources may be used to determine a most cost-effective energy output associated with the plurality of power resources.

However, the supply of available energy from the PV installation may be dependent on a current weather condition. While the optimization scheme may use the current weather condition to determine a most cost-effective energy output associated with the plurality of power resources, the optimization scheme may fail to consider future weather conditions and the impact the future weather conditions may have on the supply of available energy from the PV installation. By failing to consider future weather conditions and the effect the future weather conditions may have on the supply of available energy from the PV installation, the optimization scheme may fail to minimize an overall cost associated with the energy output of the plurality of power resources.

One attempt to determine a most-cost effective energy output associated with a plurality of power resources is disclosed in U.S. Pat. No. 9,438,041 B2 that issued to Roy et al. on Sep. 6, 2016 ("the '041 patent"). In particular, the '041 patent discloses a component in an energy system controller that controls the operation of energy resources interconnected into one energy system to provide optimal energy management for a customer.

While the component of the '041 patent may disclose a system for providing optimal energy management for a customer, the '041 patent fails to disclose that the system considers future weather conditions and the affect that the future weather conditions may have on a supply of available energy from a renewable energy resource, such as, for example, a PV installation.

The micro-grid site predictive control for multi-power resource management system of the present disclosure solves one or more of the problems set forth above and/or other problems in the art.

SUMMARY

According to some implementations, a method may include receiving, by an optimizer module of a device, a power demand for a load; receiving, by the optimizer module, a weather forecast for a time period; determining, by the optimizer module, a first supply of power available from a photo voltaic (PV) installation for the time period based on the weather forecast; determining, by the optimizer module, a power deficit for the time period based on the power demand and the first supply of power; determining, by the optimizer module, a first cost associated with utilizing a second supply of power available from a battery for the time period; determining, by the optimizer module, a second cost associated with utilizing a third supply of power available from an engine for the time period; determining, by the optimizer module, a power source to overcome the power deficit based on the first cost and the second cost, wherein the power source includes at least one of the battery or the engine; and sending, by a supervisor module, a request to the PV installation and the power source to cause the PV installation and the power source to supply power to satisfy the power demand for the load.

According to some implementations, a device may include one or more memories; and one or more processors, communicatively coupled to the one or more memories, configured to: receive a power demand for a load; receive a weather forecast for a time period; determine a first supply of power available from a photo voltaic (PV) installation for the time period based on the weather forecast; determine a power deficit for the time period based on the power demand and the first supply of power; determine a first cost associated with utilizing a second supply of power available from a battery for the time period; determine a second cost associated with utilizing a third supply of power available from an engine for the time period; determine a power source to overcome the power deficit based on the first cost and the second cost, wherein the power source includes at least one of the battery or the engine; and send a request to the PV installation and the power source to cause the PV installation and the power source to supply power to satisfy the power demand for the load.

According to some implementations, a system may include a plurality of power resources; and a power control device. The power control device may be configured to: receive a power demand; receive a first weather forecast for a first time period and a second weather forecast for second time period, wherein the second time period is after the first time period; determine a first supply of power available from a first power resource, of the plurality of power resources, over the first time period based on the first weather forecast and a second supply of power available from the first power resource over the second time period based on the second weather forecast; determine a power deficit for the first time period based on the power demand and the first supply of power; determine a cost associated with utilizing a third supply of power from a second power resource, of the plurality of power resources, over the first time period; determine a cost associated with utilizing the fourth supply of power from a third power resource, of the plurality of power resources, over the first time period; select one or more of the second power resource or the third power resource, as a selected power source, to satisfy the power deficit based on the second supply of power, the cost associated with utilizing the third supply of power, and the cost associated with utilizing the fourth supply of power; and transmit a request to the first power resource and the selected power resource to cause the first power resource and the selected power resource to supply power to satisfy the power demand.

DETAILED DESCRIPTION

This disclosure relates to a power control system for a power generation system. The power control system has universal applicability to any power generation system utilizing a similar power control system.

Figure 1:
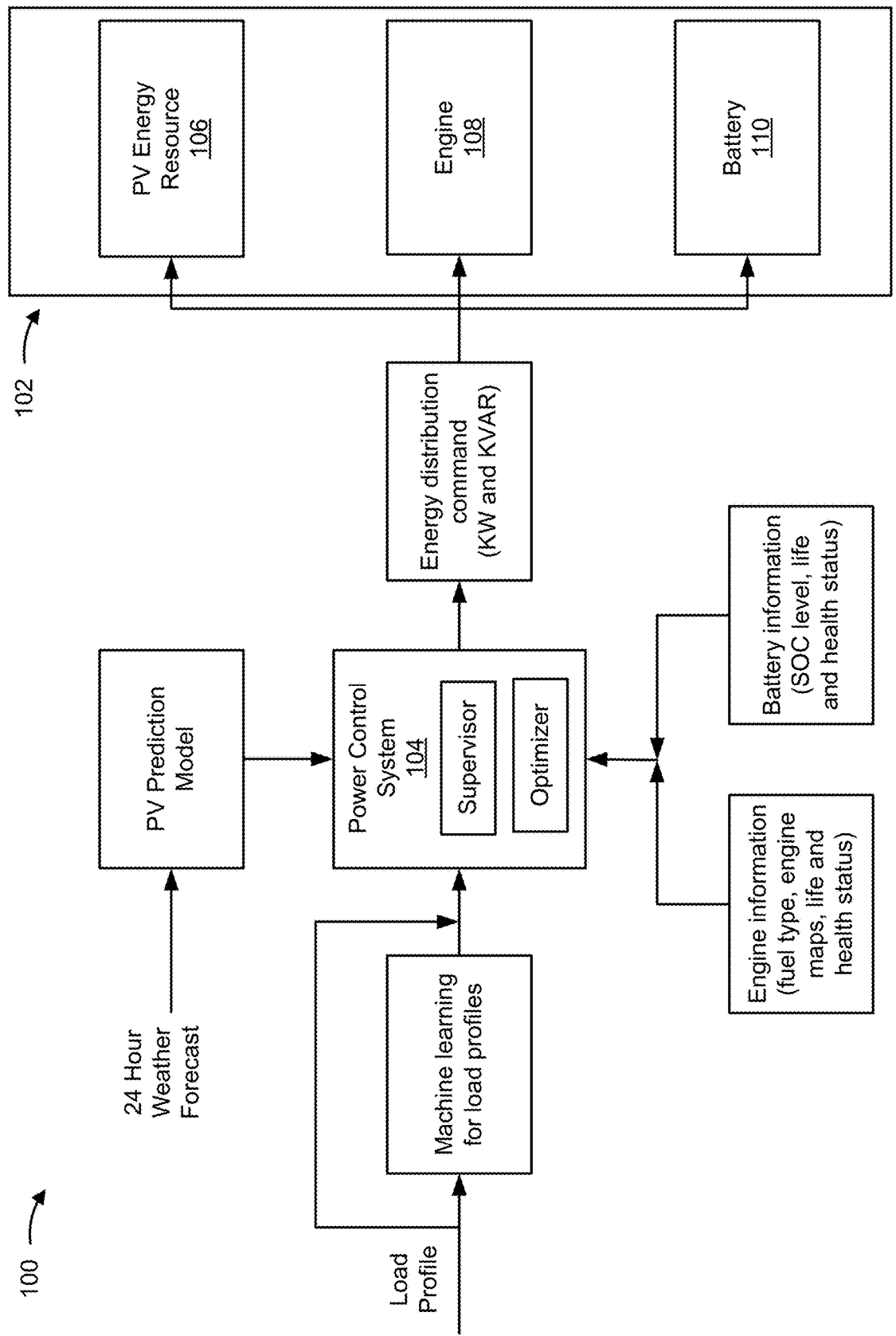
FIG. 1 is diagram of an example power generation system described herein.

FIG. 1 is a diagram of an example power generation system 100 described herein. The power generation system 100 includes a plurality of power resources 102 that are configured to supply energy to a load and/or to store energy based on power control information received from a power control system 104. Devices of the power generation system 100 may interconnect via wired connections, wireless connections, or a combination of wired and wireless connections.

The power resources 102 may include a renewable energy resource, a dispatchable energy resource, a stored energy resource, and/or another type of energy resource. The renewable energy resource is a power resource that produces energy from a source that is naturally replenishing but flow-limited such as, for example, wind, solar, geothermal, biomass, and hydropower. The renewable energy resource is an intermittent and non-dispatchable energy resource that generates electricity upon receiving an input from an energy flow (e.g., solar power, wind power, and/or the like). The renewable energy resource may be a solar energy resource (e.g., a photo-voltaic energy resource), a wind energy resource (e.g., a wind mill), a hydro-electric energy resource (e.g., a turbine), and/or another type of renewable energy resource.

As shown in FIG. 1, the primary renewable energy resource is a photo-voltaic (PV) energy resource 106. The PV energy resource 106 includes a PV installation that includes a plurality of PV devices or solar cells that convert sunlight into electricity. The PV devices are arranged to form PV panels and multiple PV panels are arranged in PV arrays to form the PV installation. The PV installation converts sunlight into electricity and provides the electricity to a load and/or to the stored energy resource based on power control information received from the power control system 104.

A secondary power resource is configured to accept power input from a primary power source and provides the power output to a client. The secondary power resource is a dispatchable energy resource that can be used on demand (e.g., can be turned on or off) and can adjust the power output supplied to the client such as a load, based on power control information received from the client controller such as the power control system 104. As shown in FIG. 1, the dispatchable energy resource is an engine 108 that is configured to provide electrical power to a load. The engine 108 may be any type of internal combustion engine, such as, for example, a gas engine, a diesel engine, a dynamic gas blending (DGB) engine, and/or a combination thereof.

The stored energy resource is an energy storage device that receives and stores energy from, for example, one of the power resources 102 (e.g., a renewable energy resource and/or a dispatchable energy resource). The energy storage device provides the stored energy to a load based on power control information received from the power control system 104. As shown in FIG. 1, the energy storage device is a battery 110, such as, for example, an electro-chemical battery (e.g., a sodium sulfur battery, a sodium-nickel chloride battery, a lithium polymer battery, a lithium ion battery, a lead-acid battery, a nickel-cadmium battery, and/or the like) and/or another type of battery suitable for storing energy and providing the stored energy to a load.

Each of the power resources 102 has an electronic control module (ECM) that includes one or more devices that provide corresponding control of the power resource based on power control information received from the power control system 104.

The ECMs may execute instructions to perform various control functions and processes to control the plurality of power resources 102 according to instructions from the power control system 104. The ECMs may include any appropriate type of power resource control system configured to perform control functions such that the plurality of power resources 102 may operate as described herein. Further, the ECM may also control another system of a vehicle or machine, such as a transmission system, a hydraulics system, and/or the like.

The power control system 104 includes one or more devices that provide power control information to control power output from the plurality of power resources 102. The power control system 104 uses the power control information to cause the ECMs of the plurality of power resources 102 to control respective amounts of power that are contributed from the plurality of power resources 102 to a load. In some implementations, the power control system 104 is implemented as a processor. The processor is implemented in hardware, firmware, or a combination of hardware and software.

As shown in FIG. 1, the power control system 104 includes an optimizer module and a supervisor module for managing and controlling the output of energy by the plurality of power resources 102 based on a load profile. The load profile indicates a power demand and/or variations in a load over a specified time period. The optimizer module determines the power resources 102 for supplying sufficient energy to meet the power demand and the supervisor module controls the output of the power resources 102, as described elsewhere herein.

As shown in FIG. 1, the power control system 104 receives a load profile. For example, the power control system 104 receives a load profile from an electronic control module (ECM) of the engine 108. The power control system 104 (e.g., the optimizer module) identifies one or more of the power resources 102 to provide the energy to the load. In some implementations, the power control system 104 initially determines whether an amount of available energy associated with the PV energy resource 106 is sufficient to satisfy the power demand identified in the load profile.

The power control system 104 determines an amount of available energy associated with the PV energy resource 106. For example, the power control system 104 may query and/or transmit a signal to an ECM of the PV energy resource 106. The ECM of the PV energy resource 106 may send information indicating an amount of energy available to be supplied to the load by the PV energy resource 106 based on the query and/or receiving the signal from the power control system 104. The power control system 104 determines the amount of available energy associated with the PV energy resource 106 based on the information indicating the amount of energy available to be supplied to the load by the PV energy resource 106.

In some implementations, the amount of available energy associated with the PV energy resource 106 is equal to the power demand. The power control system 104 (e.g., the optimizer module) determines that the power demand can be satisfied by utilizing the available energy associated with the PV energy resource 106 based on the amount of available energy associated with the PV energy resource 106 being equal to the power demand.

The power control system 104 (e.g., the supervisor module) transmits power control information to the PV energy resource 106 to cause the PV energy resource 106 to supply energy to the load during the specified time period. For example, the power control system 104 may transmit an energy distribution command to the PV energy resource 106. The energy distribution command includes information indicating that the PV energy resource 106 is to supply the required quantity of energy to the load over the specified time period. The PV energy resource 106 receives the energy demand command and provides the available energy associated with the PV energy resource 106 to the load over the specified time period based thereon.

In some implementations, the amount of available energy associated with the PV energy resource 106 is greater than the power demand. The power control system 104 (e.g., the optimizer module) determines that the power demand can be satisfied by a portion of the available energy associated with the PV energy resource 106 based on the amount of available energy associated with the PV energy resource 106 being greater than the power demand. The power control system 104 determines that the surplus portion of the available energy associated with the PV energy resource 106, is to be provided to, and stored by, the battery 110.

The power control system 104 (e.g., the supervisor module) transmits power control information to the PV energy resource 106 causing the PV energy resource 106 to provide a sufficient amount of the available energy associated with the PV energy resource 106 sufficient to satisfy the power demand over the specified time period and to provide the surplus portion of the available energy associated with the PV energy resource 106 to the battery 110.

For example, the power control system 104 transmits a first energy distribution command to the PV energy resource 106. The first energy distribution command indicates that the PV energy resource 106 is to supply a portion of the available energy associated with the PV energy resource 106 sufficient to satisfy the power demand to the load over the specified time period and that a remaining portion of the available energy associated with the PV energy resource 106 is to be provided to the battery 110 if the battery 110 is not fully charged.

The PV energy resource 106 receives the first energy distribution command. The PV energy resource 106 causes the portion of the available energy associated with the PV energy resource 106 sufficient to satisfy the power demand to the load over the specified time period and causes a remaining portion of the available energy associated with the PV energy resource 106 to be provided to the battery 110 based on the first energy distribution command.

Additionally, the power control system 104 transmits power control information to the battery 110 to cause the battery 110 to receive and store the remaining portion of the available energy associated with the PV energy resource 106.

For example, the power control system 104 transmits a second energy distribution command to the battery 110. The second energy distribution command indicates that the battery 110 is to receive the remaining portion of the available energy associated with the PV energy resource 106 from the PV energy resource 106. The second energy distribution command also indicates that the battery 110 is to store the remaining portion of the available energy associated with the PV energy resource 106 and/or that the battery 110 is not to provide any portion of the remaining portion of the available energy associated with the PV energy resource 106 to the load during the specified time period.

Based on the second energy distribution command, the battery 110 receives the remaining portion of the available energy associated with the PV energy resource 106 from the PV energy resource 106. Additionally, the battery 110 stores the remaining portion of the available energy associated with the PV energy resource 106 and/or does not provide any portion of the remaining portion of the available energy associated with the PV energy resource 106 to the load during the specified time period.

In some implementations, there is a power deficit. A power deficit refers to the amount of available energy associated with the PV energy resource 106 being insufficient to satisfy the power demand. The power control system 104 (e.g., the optimizer module) determines that a first portion of the power demand is to be satisfied by utilizing the available energy associated with the PV energy resource 106. The power control system 104 determines an amount of energy to be provided by the engine 108 and/or an amount of energy to be provided by the battery 110 to satisfy the second portion of the power demand based on a predicted load profile for a subsequent time period occurring after the time period specified in the power demand, a predicted amount of energy that the PV energy resource 106 will be able to provide during the subsequent time period, an engine cost, and/or a battery cost.

In some implementations, the power control system 104 utilizes machine learning techniques to determine the predicted amount of energy that the PV energy resource 106 will be able to provide during the subsequent time period and the predicted load profile. For example, the power control system 104 may train and utilize a PV energy prediction model to predict an amount of energy that the PV energy resource 106 will be able to provide during the subsequent time period, as described elsewhere herein. The power control system 104 may train and utilize a load profile prediction model to predict a power demand for the subsequent time period, as described elsewhere herein.

The engine cost is a cost associated with utilizing the engine 108 to provide sufficient energy to satisfy the second portion of the power demand. The power control system 104 determines the engine cost based on one or more engine parameters associated with the engine 108.

As shown in FIG. 1, the power control system 104 obtains engine information associated with the engine 108. The engine information may include information indicating a type of fuel (e.g., gasoline, diesel fuel, a diesel-gas blend fuel, and/or the like) utilized by the engine 108, an engine map associated with the engine 108, life and health status information associated with the engine 108, and/or the like. The engine information may be input by a user via a user interface associated with the power control system 104. Alternatively, and/or additionally, the power control system 104 may receive the engine information from an ECM of the engine 108.

The information indicating the type of fuel utilized by the engine 108 may include information indicating a type of the engine 108, a model of the engine 108, a manufacturer of the engine 108, a serial number associated with the engine 108, and/or another type of information that can be utilized to determine a type of fuel utilized by the engine 108.

The engine map includes information indicating a behavior of the engine 108 when the engine 108 is subjected to changes in various parameters, such as a change in load (e.g., a change in an opening of a throttle of the engine 108), a change in ignition timing, a change in an air-fuel ratio, a change in a temperature of the engine 108, a change in an ambient temperature associated with the engine 108, and/or the like.

The life and health status information may include information associated with the operation of the engine 108. For example, the life and health status information may include information indicating an age (e.g., a number of running hours) of the engine 108, information indicating a temperature of the engine 108, information indicating an ambient temperature associated with the engine 108, and/or the like.

In some implementations, the power control system 104 determines the engine cost by determining the type of fuel utilized by the engine 108 based on the type of engine. For example, the power control system 104 accesses information in a data structure stored in a database. The database may contain information identifying a type of fuel utilized by various types of engines, optimal power distribution between PV energy resource 106 and battery 110 for various types of engines, and the like.

The power control system 104 determines a cost per unit of fuel (e.g., gallon, liter, and/or the like) for each type of fuel utilized by the engine. For example, if the power control system 104 determines that the engine 108 utilizes diesel fuel, then the power control system 104 determines a cost associated with one (1) gallon of diesel fuel. The database may include information identifying a type of fuel utilized by various types of engines and a cost per unit of fuel associated with each type of fuel utilized by the various types of engines. The power control system 104 may determine a cost per unit of fuel for the type of fuel utilized by the engine 108 based on the information included in the database. In some implementations, the engine 108 may be a DGB engine and the power control system 104 may utilize an engine substitution map to convert a cost of gasoline utilized by the DGB engine to an equivalent cost of fuel (e.g., a cost of diesel fuel).

The power control system 104 determines an amount of the type of fuel required for the engine 108 to produce a unit of energy (e.g., a kilowatt-hour) based on the type of the fuel, the engine maps, and/or the information indicating the health status of the engine. The power control system 104 determines the engine cost based on the cost per unit of the type of fuel utilized by the engine 108, amount of fuel required for the engine 108 to produce the unit of energy, and an amount of sufficient energy to satisfy the second portion of the power demand.

For example, the power control system 104 divides the amount of sufficient energy to satisfy the second portion of the power demand by the unit of energy to determine a number of units of sufficient energy to satisfy the second portion of the power demand. The power control system 104 multiplies the number of units of sufficient energy to satisfy the second portion of the power demand by the amount of the type of fuel required for the engine 108 to produce the unit of energy to determine a total amount of fuel. The power control system 104 multiplies the total amount of fuel by the cost of the type of fuel per unit to determine an initial engine cost.

In some implementations, the power control system 104 modifies the initial engine cost based on an effect utilizing the engine 108 to provide sufficient energy to satisfy the second portion of the power demand has on the maintenance, repair, and/or life of the engine 108. The initial cost is a numeric value representing a cost of a fuel utilized by the engine 108 to provide sufficient energy to satisfy the second portion of the power demand. Utilizing the engine 106 to provide sufficient energy to satisfy the second portion of the power demand negatively affects (e.g., shortens) an amount of time before the engine 108 will require maintenance, repair, and/or replacement. The power control system 104 modifies (e.g., increases) the numeric value to account for the reduction in the amount of time before the engine 108 will require maintenance, repair, and/or replacement.

The power control system 104 determines the battery cost based on battery information associated with the battery 110. The power control system 104 utilizes a real-time, dynamic equivalent Break Specified Fuel Consumption (BSFC) map to determine the battery cost. The BSFC map is updated based on an immediate cost for charging the battery 110. The BSFC map is weighted based on the aging of the battery and/or based on a cost to replace the battery 110.

As shown in FIG. 1, the battery information includes information indicating a state of charge (SOC) of the battery 110 and/or life and health status information associated with the battery 110.

The information indicating the SOC of the battery 110 includes information indicating an amount of energy stored in the battery 110. For example, a current voltage of the battery 110, a maximum operating voltage of the battery 110, a maximum amount of energy stored in the battery 110, and/or the like.

The life and health status information may include information indicating a bi-directional loss associated with utilizing the battery 110 to provide sufficient energy to satisfy the second portion of the power demand, information indicating an age of the battery 110, a number of cycles associated with the battery 110, a depth of the cycles associated with the battery 110, a temperature of the battery 110, an ambient temperature associated with the battery 110, and/or the like.

To determine the battery cost, the power control system 104 determines an available amount of energy stored in the battery 110 based on the information indicating the SOC of the battery 110. For example, the power control system 104 compares the current voltage to the maximum operating voltage of the battery 110 to determine an amount of energy stored in the battery 110.

The power control system 104 determines whether the energy stored in the battery 110 is sufficient to satisfy the second portion of the power demand. In some implementations, the power control system 104 determines current voltage is equal to the maximum operating voltage of the battery 110. The power control system 104 determines that the battery 110 is fully charged (e.g., has the maximum amount of stored energy available) based on the current voltage being equal to the maximum operating voltage of the battery 110. The power control system 104 determines whether the amount of energy stored in the battery 110 is sufficient to satisfy the second portion of the power demand based on comparing the amount of energy stored in the battery 110 and an amount of sufficient energy to satisfy the second portion of the power demand.

In some implementations, the power control system 104 determines that the amount of energy stored in the battery 110 is sufficient to satisfy the second portion of the power demand. In these implementations, the power control system 104 determines a cost associated with charging the battery 110 after utilizing the battery 110 to provide sufficient energy to satisfy the second portion of the power demand.

For example, the power control system 104 may determine an amount of sufficient energy to recharge the battery 110 after the battery 110 provides sufficient energy to satisfy the second portion of the power demand. The sufficient energy to recharge the battery 110 may include an amount of sufficient energy to satisfy the second portion of the power demand and an amount of energy corresponding to any bi-directional loss of energy resulting from providing the sufficient energy to satisfy the second portion of the power demand. Because all of the available energy associated with the PV energy resource 106 is to be provided to satisfy the first portion of the power demand, the power control system 104 determines a cost associated with utilizing the engine 108 to provide the battery 110 with the amount of sufficient energy to recharge the battery 110.

The power control system 104 determines the cost associated with utilizing the engine 108 to provide the battery 110 with sufficient energy to recharge the battery 110 based on the type of engine. For example, the power control system 104 accesses information in the database and determines the type of fuel utilized by the engine 108 based on the information included in the database in a manner similar to that described above.

The power control system 104 determines a cost per unit of fuel (e.g., gallon, liter, and/or the like) for the type of fuel utilized by the engine 108. For example, the power control system 104 determines that the engine 108 utilizes diesel fuel. The power control system 104 determines a cost associated with a unit of diesel fuel by, for example, accessing information in a database in a manner similar to that described above. The power control system 104 determines a cost per unit of fuel for the type of fuel utilized by the engine 108 based on the information included in the database.

The power control system 104 determines an amount of the type of fuel required for the engine 108 to produce a unit of energy (e.g., a kilowatt-hour) based on the type of the fuel, the engine maps, and/or the information indicating the health status of the engine. The power control system 104 determines a cost associated with utilizing the engine 108 to recharge the battery 110 based on the cost per unit of the type of fuel utilized by the engine 108, an amount of fuel required for the engine 108 to produce the unit of energy, and an amount of energy required to recharge the battery 110.

For example, the power control system 104 divides the amount of energy required to recharge the battery 110 by the unit of energy to determine a number of units of energy required to recharge the battery 110. The power control system 104 multiplies the number of units of energy required to recharge the battery 110 by the amount of the type of fuel required for the engine 108 to produce the unit of energy to determine a total amount of fuel. The power control system 104 multiplies the total amount of fuel by the cost of the type of fuel per unit of fuel to determine the cost associated with utilizing the engine 108 to provide the battery 110 with the amount of sufficient energy to recharge the battery 110.

The power control system 104 determines a first degradation factor based on an age of the battery 110. The first degradation factor may correspond to the impact the age of the battery 110 has on a performance of a battery. For example, relative to a younger battery, an older battery may have a diminished capacity for storing energy, an increased internal resistance, and/or an elevated self-discharge rate.

A diminished capacity for storing energy refers to a decrease in a maximum amount of energy the battery 110 can store. The capacity of the battery 110 may diminish as the battery 110 ages. For example, the battery 110 may include one or more electro-chemical cells that store chemical energy that can be converted to electrical energy, such as, for example, a lithium-ion battery. The ability of the electro-chemical cells to store chemical energy decreases based on an age of the battery 110 and a cycle count of the battery 110 (e.g., a number of times the battery 110 discharges stored energy).

In some implementations, the battery 110 may include one or more electro-chemical cells and the conversion of chemical energy to electrical energy may cause the internal resistance of the battery 110 to increase. The internal resistance of the battery 110 affects the ability of the battery 110 to deliver stored energy. As stored energy is being provided by the battery 110, an increase in an internal resistance of the battery 110 causes a voltage drop and an increase in a temperature of the battery 110. The voltage drop may diminish the ability of the battery 110 to provide energy to a load. Additionally, the increased temperature of the battery 110 may reduce a life of the battery 110.

The self-discharge rate of the battery 110 is the rate at which the battery 110 fails to retain stored energy. The self-discharge rate may be greatest immediately following the battery 110 being charged and may taper off to a set rate over time. The self-discharge rate of the battery 110 increases with an age of the battery 110, a cycling of the battery 110, and/or an elevated temperature of the battery 110.

The power control system 104 determines a second degradation factor associated with the SOC of the battery 110. Fully discharging (e.g., utilizing all of the stored energy associated with the battery 110) the battery 110 may result in a stress being applied to the battery 110 by not allowing for some amount of stored energy to be self-discharged by the battery 110. For example, an operator may cause a battery to be fully discharged to avoid the cost associated with utilizing another energy resource such as, for example, the engine 108. The stress applied to the battery 110 may cause a capacity of the battery 110 to store energy to be diminished.

The power control system 104 determines a third degradation factor based on a cycle count of the battery 110, a depth of the cycles (e.g., how much of the stored energy is utilized before the battery 110 is recharged), and/or a temperature of the battery 110. Frequent discharge of the battery 110, discharging the battery 110 to below a particular SOC (e.g., 30 percent SOC), and/or elevated temperatures may cause battery stress that results in a decrease in a life of the battery 110 and/or a diminished capacity of the battery 110.

The power control system 104 determines the battery cost based on the cost associated with utilizing the engine 108 to provide the battery 110 with the amount of energy required to recharge the battery 110, the first degradation factor, the second degradation factor, and the third degradation factor. For example, the power control system 104 may determine an accumulated weighted factor that adds a weighted value associated with the first degradation, a weighted value associated with the second degradation factor, and a weighted valued associated with the third degradation factor to the cost associated with utilizing the engine 108 to provide the battery 110 with the amount of sufficient energy to recharge the battery 110.

In some implementations, the power control system 104 determines that the amount of energy stored in the battery 110 is not sufficient to satisfy the second portion of the power demand. In these implementations, the power control system 104 determines a remainder of the second portion of the power demand to be satisfied by the engine 108. The power control system 104 determines the cost in these implementations based on a cost associated with utilizing the battery 110 to provide all the stored energy associated with the battery 110 to the load, a cost associated with utilizing the engine 108 to provide the battery 110 with the amount of sufficient energy to recharge the battery 110, and a cost associated with utilizing the engine 108 to provide sufficient energy to satisfy the remainder of the second portion of the power.

The power control system 104 determines the cost associated with utilizing the battery 110 to provide all the energy stored in the battery 110 to the load and/or the cost associated with utilizing the engine 108 to provide the battery 110 with the amount of energy required to recharge the battery 110 in a manner similar to that described above with respect to determining the battery cost. The power control system 104 determines the cost associated with utilizing the engine 108 to provide sufficient energy to satisfy the remainder of the second portion of the power demand in a manner similar to that described above with respect to the engine 108.

The power control system 104 (e.g., the optimizer module) determines an initial power supply plan based on the engine cost and the battery cost. The initial power supply plan may indicate an amount of energy to be provided by the engine 108 and/or an amount of energy to be provided by the battery 110 to satisfy the second portion of the power demand.

The initial power supply plan may optimize or minimize a cost (e.g., the engine cost and/or the battery cost) associated with providing sufficient energy to satisfy the second portion of the power demand. The cost may be a cost per unit of active power (e.g., kilo watt power (KW)) and/or a cost per unit of reactive power (e.g., kilo volt ampere reactive (KVAR)). The power control system 104 determines an amount of the second portion of the power demand to be satisfied utilizing energy provided by the engine 108 and an amount of the second portion of the power demand to be satisfied utilizing energy provided by the battery 110 such that a cost per unit of active power and/or a cost per unit of reactive power is minimized.

The power control system 104 (e.g., the optimizer module) determines a final power supply plan by modifying the initial power supply plan based on the predicted load profile for the subsequent time period and/or the amount of energy associated with the PV energy resource 106 available to be provided to a load during the subsequent time period.

As indicated in FIG. 1, the power control system 104 uses a machine learning model, such as a load profile model, to determine the predicted load profile for the subsequent time period. The power control system 104 obtains a plurality of load profiles associated with the power generation system 100. Each load profile, of the plurality of load profiles, includes information indicating a demand and/or a variation in a load for a particular time period. For example, over a period of time (e.g., a day, a month, a year, and/or another period of time), the power control system 104 may store load profiles received from an ECM of one or more of the plurality of power resources 102 in a memory associated with the power control system 104.

The power control system 104 trains the load profile model using the plurality of load profiles associated with the power generation system 100 according to the one or more load profile parameters associated with the power generation system 100. The one or more load profile parameters may include a load factor, a diversity factor, a utilization factor, a demand factor, and/or the like.

The load factor for a particular load profile is an average load divided by a peak load for a time period associated with the particular load profile. The diversity factor is a ratio of a sum of individual, non-coincident maximum loads of a sub-division of the power generation system 100 to a maximum demand of the power generation system 100. The utilization is a ratio of a time that a power resource (e.g., PV energy resource 106, engine 108, and/or battery 110), of the plurality of power resources 102, is in use to a total time that the power resource could be in use. The demand factor is a fractional amount of energy being provided by a power resource (e.g., PV energy resource 106, engine 108, and/or battery 110), of the plurality of power resources 102, relative to a maximum amount of energy that could be provided by the power resource.

The power control system 104 determines the one or more load profile parameters based on the plurality of load profiles. In some implementations, the power control system 104 performs a data preprocessing operation when generating the load profile model to determine the one or more load profile parameters. For example, the power control system 104 may analyze each stored load profile to determine a load factor, a diversity factor, a utilization factor, and/or a demand factor and a time period associated with each parameter of the one or more parameters. Using the plurality of load profiles and the one or more load profile parameters as inputs to the load profile model, the power control system 104 determines a predicted load profile for a subsequent time period (e.g., a time period occurring after the specified time period).

As indicated in FIG. 1, the power control system 104 utilizes a machine learning model, such as a PV prediction model, to determine the amount of energy associated with the PV energy resource 106 available to be provided to a load during the subsequent time period. The PV prediction model receives, as inputs, real-time weather information (e.g., a weather forecast) and historical weather information to determine the amount of energy associated with the PV energy resource 106 available to be provided to a load during the subsequent time period, as described below.

As shown in FIG. 1, a weather forecast is input into the PV prediction model. The weather forecast may indicate one or more weather conditions associated with a time period (e.g., an hour, a day, a week, and/or the like). The power control system 104 trains the PV prediction model based on the one or more weather conditions indicated in one or more weather forecasts. The power control system 104 trains the PV prediction model using historical data associated with an amount of available energy associated with the PV energy resource 106 according to the one or more weather conditions. Using the historical data and the one or more weather conditions as inputs to the PV prediction model, the power control system 104 determines an amount of available energy associated with the PV energy resource 106 for the subsequent time period.

The power control system 104 determines a predicted power supply plan for the subsequent time period based on the predicted load profile and the amount of energy associated with the PV energy resource 106 available to be provided to a load during the subsequent time period. The power control system 104 determines the predicted power supply plan in a manner similar to that described above with respect to determining the initial power supply plan.

The power control system 104 (e.g., the optimizer module) determines the final power supply plan based on the initial power supply plan and/or the predicted power supply plan. For example, the power control system 104 may modify the initial power supply plan to optimize or minimize a cost (e.g., the engine cost and/or the battery cost) associated with providing sufficient energy to satisfy the second portion of the power demand and to optimize or minimize a cost associated with providing sufficient energy to satisfy a power demand indicated by the predicted load profile. In this way, a total cost associated with the power generation system 100 can be optimized and/or minimized.

The power control system 104 (e.g., the supervisor module) transmits power control information to the plurality of power resources 102 based on the final power supply plan. For example, as shown in FIG. 1, the power control system 104 transmits an energy distribution command to the PV energy resource 106, the engine 108, and/or the battery 110 to cause the PV energy resource 106, the engine 108, and/or the battery 110 to provide sufficient energy to meet the power demand based on the final power supply plan.

As indicated above, FIG. 1 is provided as an example. Other examples may differ from what was described in connection with FIG. 1. For example, although a single PV energy resource 106, a single engine 108, and a single battery 110 are shown, in practice, the power generation system 100 can include a plurality of PV energy resources 106, a plurality of engines 108, and/or a plurality of batteries 110.

Figure 2:
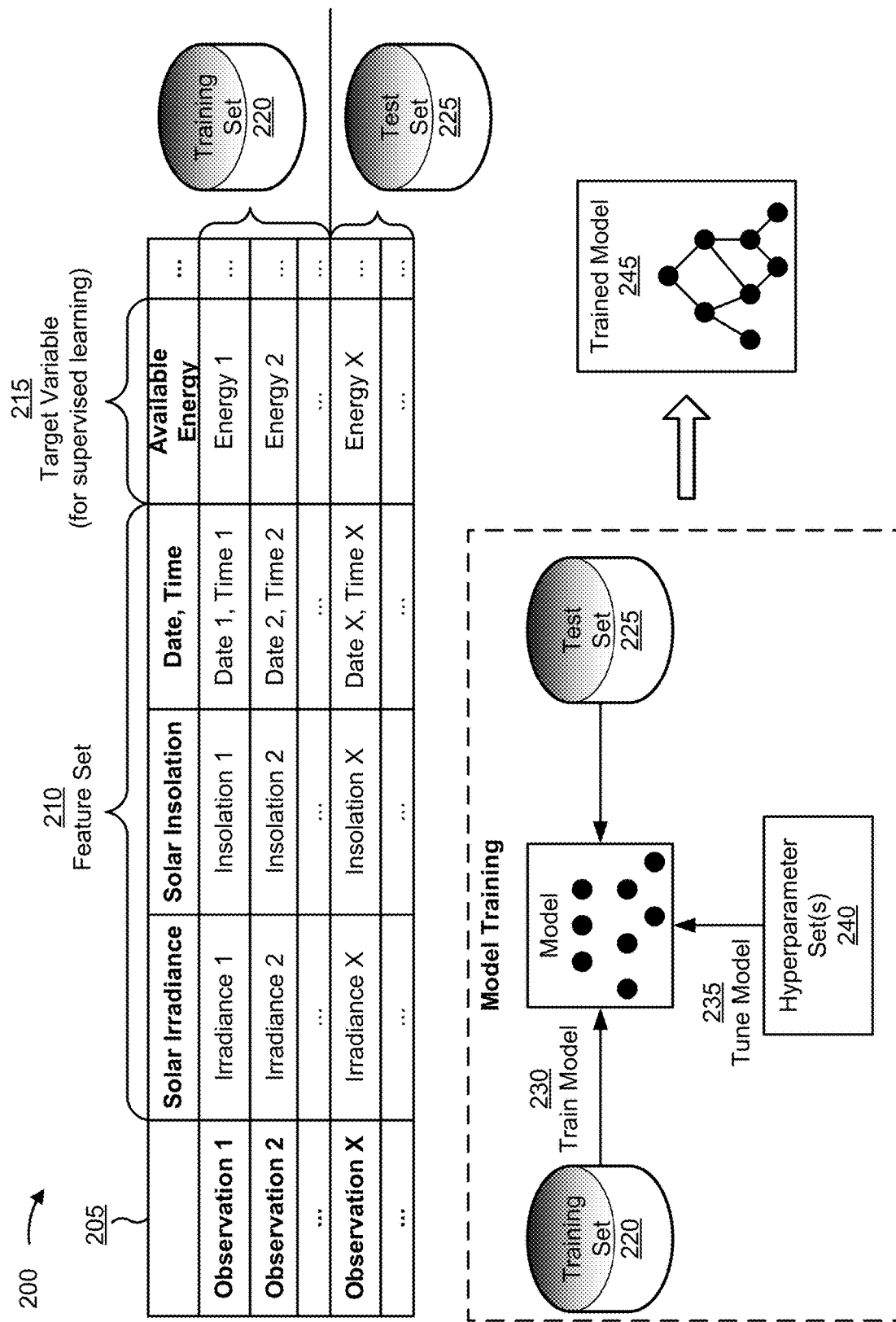
FIG. 2 is a diagram illustrating an example of training a PV energy prediction model.

FIG. 2 is a diagram illustrating an example 200 of training a PV energy prediction model. The PV energy prediction model training described herein may be performed using a machine learning system. The machine learning system may include a computing device, a server, a cloud computing environment, and/or the like, such as the power control system 104.

As shown by reference number 205, a PV energy prediction model may be trained using a set of observations. The set of observations may be obtained and/or input from historical data, such as weather forecasts gathered using one or more processes described herein. The set of observations may include a set of weather forecasts for a same period of time and/or different periods of time. In some implementations, the machine learning system may receive the set of observations (e.g., as input) from the power control system 104. Additionally, and/or alternatively, the set of observations may be input by a user.

As shown by reference number 210, a feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on input received from the power control system 104.

For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, contextual data, and/or the like. In some implementations, the machine learning system may determine features (e.g., variables types) for a feature set based on input received from the ECM of the power control system 104, the ECM of the PV energy resource 106, and/or one or more sources for providing weather data, in a manner described above. Additionally, or alternatively, the machine learning system may receive input from an operator to determine features and/or feature values such as, for example, solar irradiance, solar insolation, a weather forecast, a fuel cost, and/or the like.

In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text. For example, a user may input a weather forecast in the form of a document. The machine learning system may perform natural language processing to extract features (e.g., solar irradiance, solar insolation, cloud cover, humidity, and/or another atmospheric parameter) from the document.

As an example, as shown in FIG. 2, and by reference number 210, a feature set for a set of observations (e.g., a set of weather forecasts) may include a first feature of solar irradiance, a second feature of solar insolation, a third feature of a date and/or a time associated with the set of observations (e.g., a data and/or a time associated with a particular weather forecast), and so on. These features and feature values are provided as examples, and may differ in other examples, such as a feature of cloud cover, a feature of humidity, a feature of a chance of precipitation, a source of the weather forecast, and/or the like. In some implementations, the machine learning system may pre-process and/or perform dimensionality reduction to reduce the feature set and/or combine features of the feature set to a minimum feature set. A PV energy prediction model may be trained on the minimum feature set, thereby conserving resources of the machine learning system (e.g., processing resources, memory, and/or the like) used to train the PV energy prediction model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a PV energy prediction model is being trained to predict, and the feature set may represent the variables that are input to a trained PV energy prediction model to predict a value for the target variable. The set of observations may include target variable values so that the PV energy prediction model can be trained to recognize patterns in the feature set that lead to a target variable value. A PV energy prediction model that is trained to predict a target variable value may be referred to as a supervised learning model, a predictive model, and/or the like. When the target variable type is associated with continuous target variable values (e.g., a range of numbers and/or the like), the PV energy prediction model may employ a regression technique. When the target variable type is associated with categorical target variable values (e.g., classes, labels, and/or the like), the PV energy prediction model may employ a classification technique.

In some implementations, the PV energy prediction model may be trained on a set of observations that do not include a target variable (or that include a target variable, but the PV energy prediction model is not being executed to predict the target variable). This may be referred to as an unsupervised learning model, an automated data analysis model, an automated signal extraction model, and/or the like. In this case, the PV energy prediction model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, and a test set 225 that includes a second subset of observations. The training set 220 may be used to train (e.g., fit, tune, and/or the like) the PV energy prediction model, while the test set 225 may be used to evaluate a PV energy prediction model that is trained using the training set 220. For example, for supervised learning, the training set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a PV energy prediction model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a PV energy prediction model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the PV energy prediction model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the PV energy prediction model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a PV energy prediction model, the machine learning system may identify a set of machine learning algorithms to be used (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular PV energy prediction model using a specific machine learning algorithm and a corresponding hyperparameter set 240. In some implementations, the machine learning system may train multiple PV energy prediction models to generate a set of model parameters for each PV energy prediction model, where each PV energy prediction model corresponds to a different combination of a machine learning algorithm and a hyperparameter set 240 for that machine learning algorithm.

In some implementations, the machine learning system may perform cross-validation when training a PV energy prediction model. Cross validation can be used to obtain a reliable estimate of PV energy prediction model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random).

For a training procedure, one group may be marked as a hold-out group, and the remaining groups may be marked as training groups. For the training procedure, the machine learning system may train a PV energy prediction model on the training groups and then test the PV energy prediction model on the hold-out group to generate a cross-validation score. The machine learning system may repeat this training procedure using different hold-out groups and different test groups to generate a cross-validation score for each training procedure. In some implementations, the machine learning system may independently train the PV energy prediction model k times, with each individual group being used as a hold-out group once and being used as a training group k-1 times. The machine learning system may combine the cross-validation scores for each training procedure to generate an overall cross-validation score for the PV energy prediction model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a PV energy prediction model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm and may select the hyperparameter set 240 with the best (e.g., highest accuracy, lowest error, closest to a desired threshold, and/or the like) overall cross-validation score for training the PV energy prediction model.

The machine learning system may then train the PV energy prediction model using the selected hyperparameter set 240, without cross-validation (e.g., using all of data in the training set 220 without any hold-out groups), to generate a single PV energy prediction model for a particular machine learning algorithm. The machine learning system may then test this PV energy prediction model using the test set 225 to generate a performance score, such as a mean squared error (e.g., for regression), a mean absolute error (e.g., for regression), an area under receiver operating characteristic curve (e.g., for classification), and/or the like. If the PV energy prediction model performs adequately (e.g., with a performance score that satisfies a threshold), then the machine learning system may store that PV energy prediction model as a trained PV energy prediction model 245 to be used to analyze new observations, as described below in connection with FIG. 3.

In some implementations, the machine learning system may perform cross-validation, as described above, for multiple machine learning algorithms (e.g., independently), such as a regularized regression algorithm, a decision tree algorithm, and/or the like. Based on performing cross-validation for multiple machine learning algorithms, the machine learning system may generate multiple PV energy prediction models, where each PV energy prediction model has the best overall cross-validation score for a corresponding machine learning algorithm. The machine learning system may then train each PV energy prediction model using the entire training set 220 (e.g., without cross-validation), and may test each PV energy prediction model using the test set 225 to generate a corresponding performance score for each PV energy prediction model. The PV energy prediction model may compare the performance scores for each PV energy prediction model and may select the PV energy prediction model with the best (e.g., highest accuracy, lowest error, closest to a desired threshold, and/or the like) performance score as the trained PV energy prediction model 245.

As indicated above, FIG. 2 is provided as an example. Other examples may differ from what is described in connection with FIG. 2. For example, the PV energy prediction model may be trained using a different process than what is described in connection with FIG. 2. Additionally, or alternatively, the PV energy prediction model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
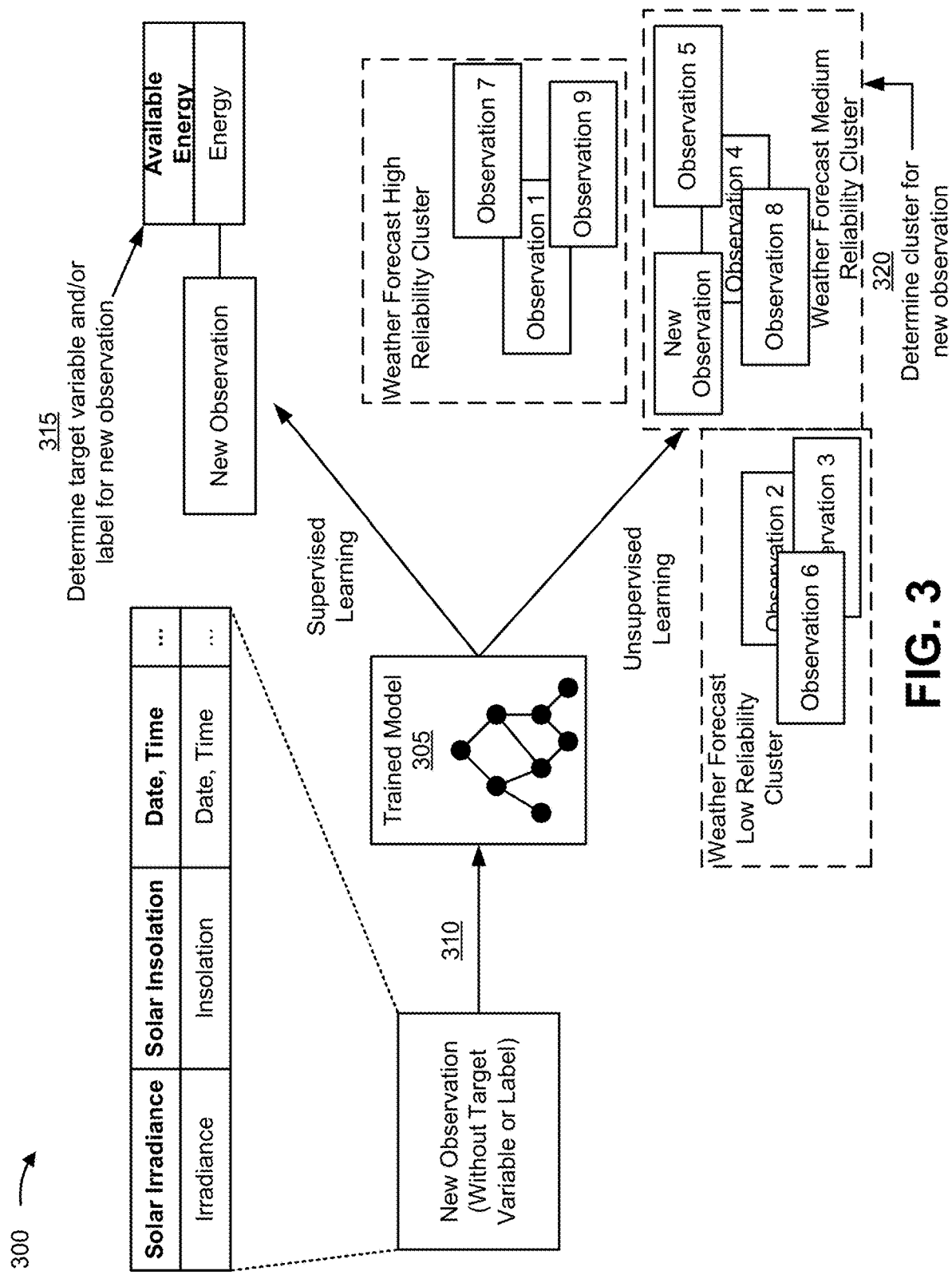
FIG. 3 is a diagram illustrating an example of applying a trained PV energy prediction model to a new observation.

FIG. 3 is a diagram illustrating an example 300 of applying a trained PV energy prediction model to a new observation. The new observation may be input to a machine learning system that stores a trained PV energy prediction model 305. In some implementations, the trained PV energy prediction model 305 may be the trained PV energy prediction model 245 described above in connection with FIG. 2. The machine learning system may include a computing device, a server, a cloud computing environment, and/or the like, such as the power control system 104.

As shown by reference number 310, the machine learning system may receive a new observation (or a set of new observations) and may input the new observation to the PV energy prediction model 305. As shown, the new observation may include a first feature of solar irradiance, a second feature of solar insolation, a third feature of a date and/or a time associated with the new observation, and so on, as an example. The machine learning system may apply the trained PV energy prediction model 305 to the new observation to generate an output (e.g., a result). The type of output may depend on the type of PV energy prediction model and/or the type of machine learning task being performed.

For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the PV energy prediction model and/or observations used to train the PV energy prediction model), and/or the like, such as when unsupervised learning is employed.

In some implementations, the trained PV energy prediction model 305 may predict an amount of energy available to be provided by the PV energy resource 106 during the subsequent time period for the target variable of "Available Energy" for the new observation, as shown by reference number 315. Based on this prediction, the machine learning system may perform an automated action and/or may cause an automated action to be performed (e.g., by instructing another device to perform the automated action), such as instructing the ECM of the PV energy resource 106 to provide the target variable to the ECM of the power control system 104 and/or to the machine learning system of the load profile prediction model.

In some implementations, the trained PV energy prediction model 305 may classify (e.g. cluster) the new observation in a weather forecast high reliability cluster, as shown by reference number 320. The observations within a cluster may have a threshold degree of similarity. Based on classifying the new observation in the weather forecast high reliability cluster, the machine learning system may provide a recommendation, such as information indicating a high reliability associated with the predicted amount of energy available to be provided by the PV energy resource 106 during the subsequent time period. Additionally, or alternatively, the machine learning system may perform an automated action and/or may cause an automated action to be performed (e.g., by instructing another device to perform the automated action), such as providing information indicating a reliability of the weather forecast to the ECM of the power control system 104 and/or to the machine learning system of the load profile prediction model.

As another example, if the machine learning system were to classify the new observation in a weather forecast low reliability cluster, then the machine learning system may provide a different recommendation (e.g., information indicating that a new and/or updated weather forecast (e.g., a weather forecast from a different source) should be obtained) and/or may perform or cause performance of a different automated action (e.g., obtaining a new and/or updated weather forecast from the same source and/or from a different source).

In this way, the machine learning system may apply a rigorous and automated process to predict an amount of energy the PV energy resource 106 can provide during the subsequent time period. The machine learning system enables recognition and/or identification of multiple features and/or feature values for multiple observations, thereby increasing an accuracy and consistency of predicting an amount of energy the PV energy resource 106 can provide during the subsequent time period relative to requiring computing resources to be allocated for multiple operators to attempt to manually predict an amount of energy the PV energy resource 106 can provide during the subsequent time period using the features or feature values.

As indicated above, FIG. 3 is provided as an example. Other examples may differ from what is described in connection with FIG. 3.

Figure 4:
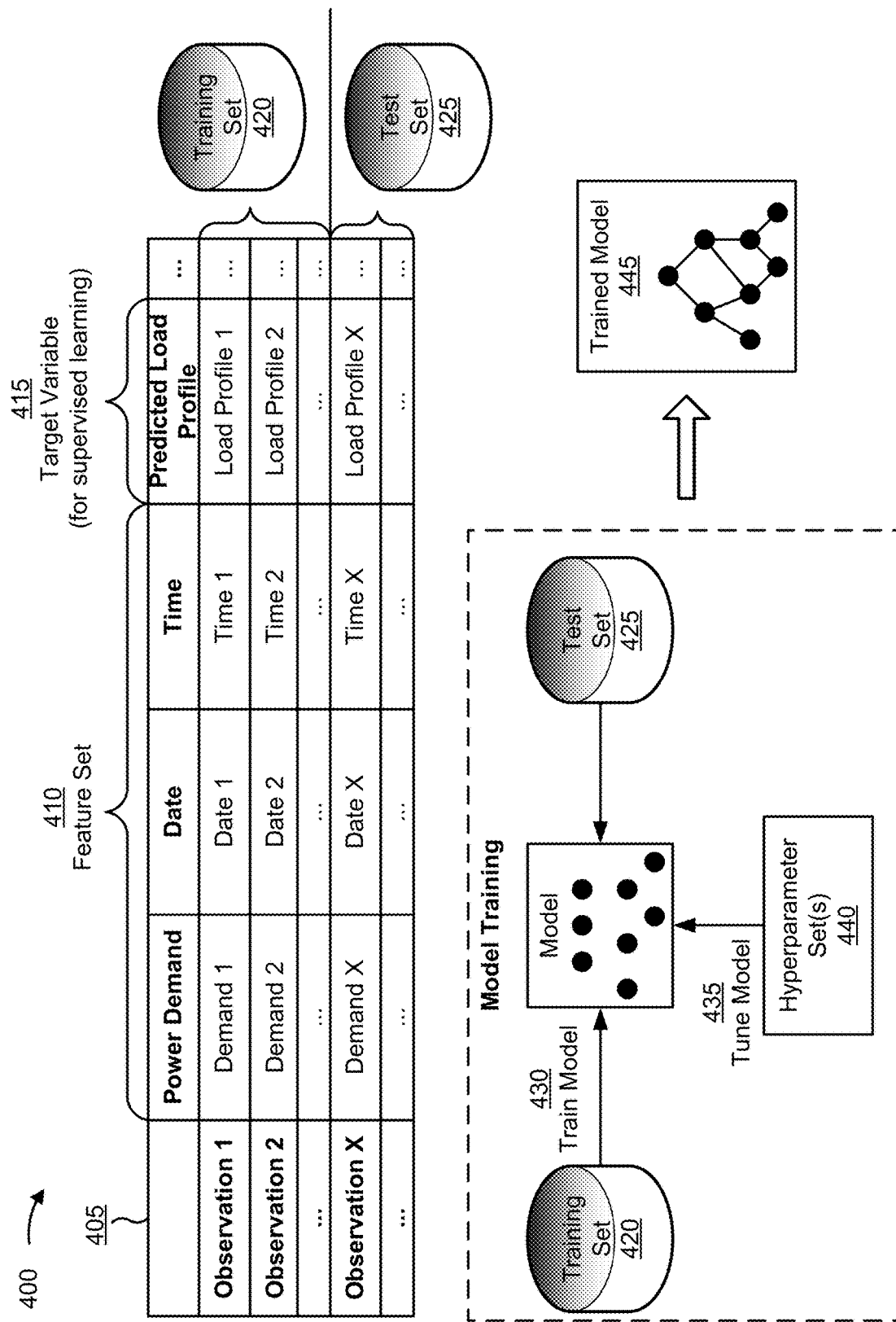
FIG. 4 is a diagram illustrating an example of training a load profile prediction model.

FIG. 4 is a diagram illustrating an example 400 of training a load profile predication model. The load profile prediction model training described herein may be performed using a machine learning system. The machine learning system may include a computing device, a server, a cloud computing environment, and/or the like, such as the power control system 104.

As shown by reference number 405, a load profile prediction model may be trained using a set of observations. The set of observations may be obtained and/or input from historical data, such as data gathered using one or more processes described herein. For example, the set of observations may include data associated with load profiles received from the ECM of the engine 108 and/or from user interaction with and/or user input to the power control system 104, as described elsewhere herein.

As shown by reference number 410, a feature set may be derived from the set of observations. In some implementations, the machine learning system may determine variable values for a specific observation based on input received from the power control system 104, in a manner similar to that described above with respect to FIG. 2.

As an example, an observation may be a load profile associated with a past time period (e.g., a historical load profile). As shown in FIG. 4, a feature set for a set of historical load profiles may include a first feature of a power demand, a second feature of a date, a third feature of a time period, and so on. These features and feature values are provided as examples and may differ in other examples. In some implementations, the machine learning system may pre-process and/or perform dimensionality reduction to reduce the feature set and/or combine features of the feature set to a minimum feature set. A load profile prediction model may be trained on the minimum feature set, thereby conserving resources of the machine learning system (e.g., processing resources, memory, and/or the like) used to train the load profile prediction model.

As shown by reference number 415, the set of observations may be associated with a target variable type of Predicted Load Profile. The Predicted Load Profile target variable type may refer to a predicted load profile for a subsequent time period. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

In some implementations, the load profile prediction model may be trained on a set of observations that do not include a target variable (or that include a target variable, but the load profile prediction model is not being executed to predict the target variable), in a manner similar to that discussed above with respect to FIG. 2.

As further shown, the machine learning system may partition the set of observations into a training set 420 that includes a first subset of observations, of the set of observations, and a test set 425 that includes a second subset of observations of the set of observations. The training set 420 may be used to train (e.g., fit, tune, and/or the like) the load profile prediction model, while the test set 425 may be used to evaluate a load profile prediction model that is trained using the training set 420, in a manner similar to that discussed above with respect to FIG. 2.

Figure 5:
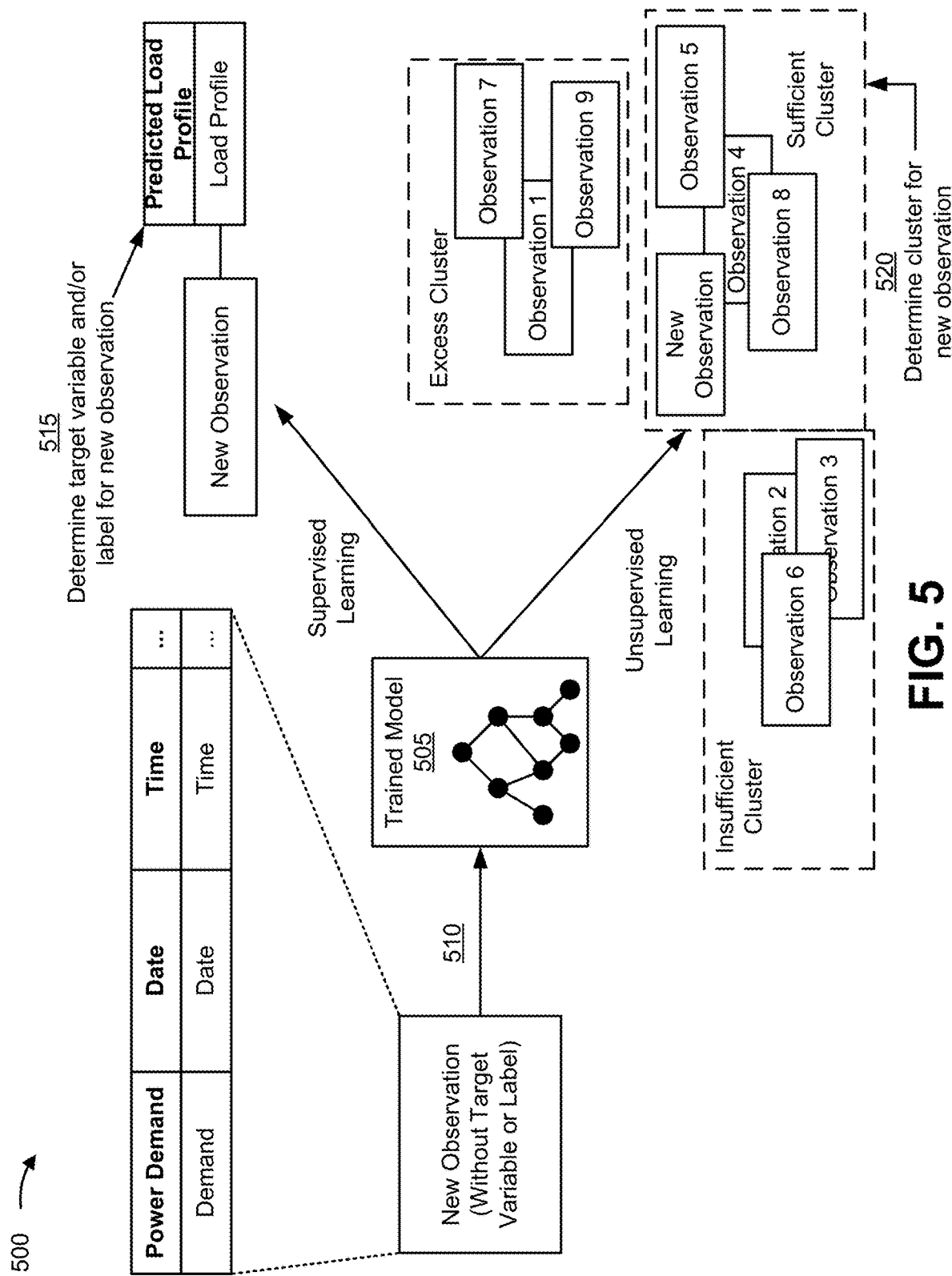
FIG. 5 is a diagram illustrating an example of applying a trained load profile prediction model to a new observation.

FIG. 5 is a diagram illustrating an example 500 of applying a trained load profile prediction model to a new observation. The new observation may be input to a machine learning system that stores a trained load profile prediction model 505. In some implementations, the trained load profile prediction model 505 may be the trained load profile prediction model 445 described above in connection with FIG. 4. The machine learning system may include a computing device, a server, a cloud computing environment, and/or the like, such as the power control system 104.

As shown by reference number 510, the machine learning system may receive a new observation (or a set of new observations) and may input the new observation to the load profile prediction model 505. As shown, the new observation may include a first feature of a power demand, a second feature of a date associated with the power demand, a third feature of a time associated with the power demand, and so on, as an example. The machine learning system may apply the trained load profile prediction model 505 to the new observation to generate an output (e.g., a result), in a manner similar to that discussed above with respect to FIG. 3.

In some implementations, the trained load profile prediction model 505 may predict a load profile for a subsequent time period for the target variable of Predicted Load Profile for the new observation, as shown by reference number 515. Based on this prediction, the machine learning system may determine whether a predicated amount of energy available to be supplied by the PV energy resource 106 during the subsequent time period is sufficient to meet a power demand associated with the predicted load profile. Additionally, or alternatively, the machine learning system may perform an automated action and/or may cause an automated action to be performed (e.g., by instructing another device to perform the automated action), such as modifying an initial power supply plan to generate a final power supply plan, as discussed elsewhere herein.

In some implementations, as shown by reference number 520, the trained load profile prediction model 505 may classify (e.g. cluster) the new observation in a "Excess Cluster" when a predicated amount of energy available to be supplied by the PV energy resource 106 during the subsequent time period exceeds a power demand associated with the predicted load profile, in a "Sufficient Cluster," when a predicated amount of energy available to be supplied by the PV energy resource 106 during the subsequent time period is equal to a power demand associated with the predicted load profile, and in an "Insufficient Cluster" when a predicated amount of energy available to be supplied by the PV energy resource 106 during the subsequent time period is insufficient to meet a power demand associated with the predicted load profile, in a manner similar to that discussed above with respect to FIG. 3.

In this way, the machine learning system may apply a rigorous and automated process to determining a power supply plan. The machine learning system enables recognition and/or identification of multiple features and/or feature values for multiple observations, thereby increasing an accuracy and consistency of determining a power supply plan relative to requiring computing resources to be allocated for multiple operators to manually determining a power supply plan using the features or feature values.

As indicated above, FIG. 5 is provided as an example. Other examples may differ from what is described in connection with FIG. 5.

Figure 6:
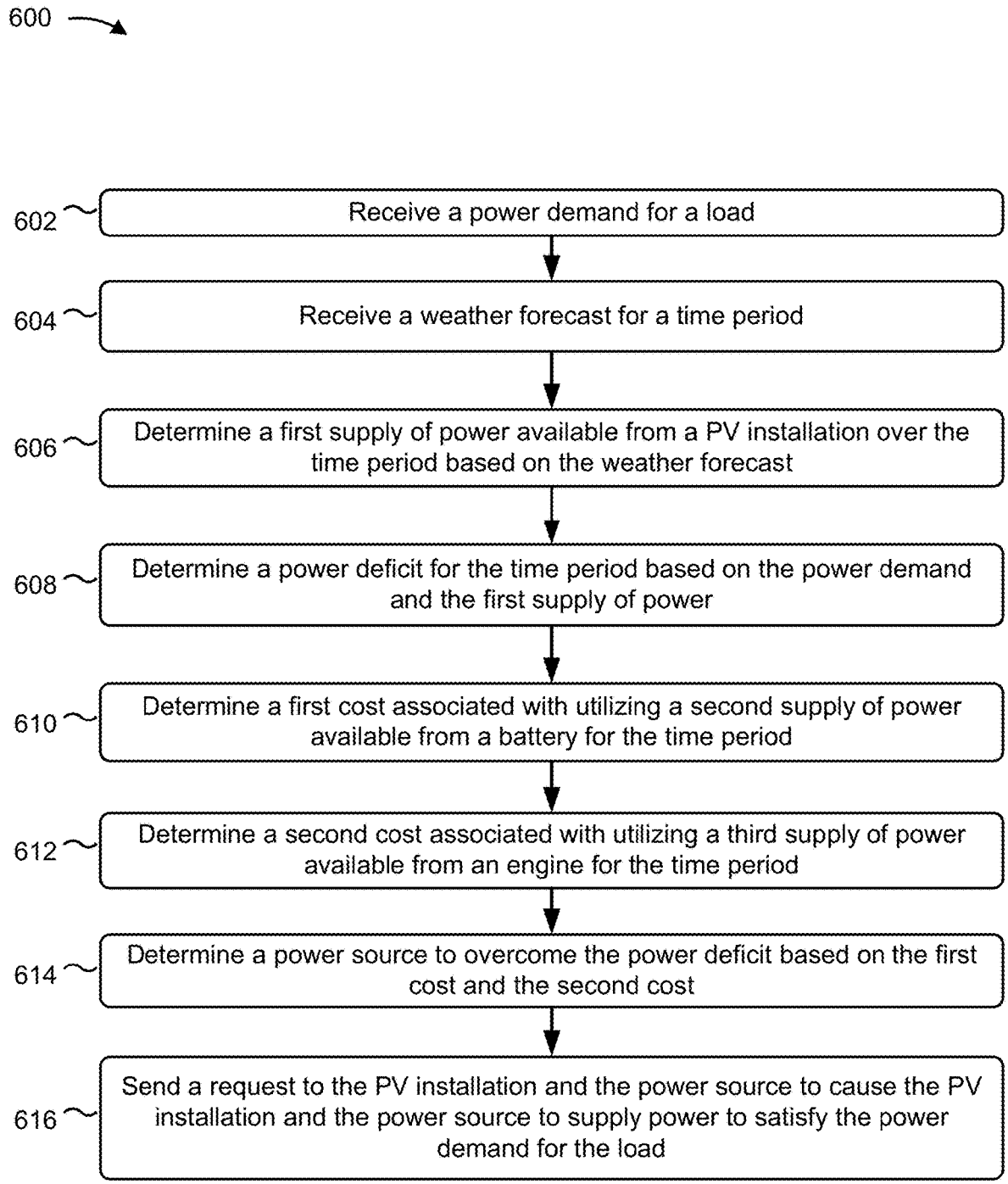
FIG. 6 is a flow chart of an example process for controlling multiple power resources.

FIG. 6 is a flow chart of an example process 600 for controlling multiple power resources. One or more process blocks of FIG. 6 may be performed by the power control system 104. Additionally, or alternatively, one or more process blocks of FIG. 6 may be performed by another device or a group of devices separate from or including the power control system 104, such as the ECM of the PV energy resource 106, the ECM of the engine 108, and/or the ECM of the battery 110.

As shown in FIG. 6, process 600 may include receiving a power demand for a load (block 602). For example, an optimizer module, of a power control system, may receive a load profile from an ECM of an engine. The load profile may indicate a power demand for a time period and the power control system (e.g., the optimizer module) may determine the power demand based on the load profile, as described above.

As further shown in FIG. 6, process 600 may include receiving a weather forecast for a time period (block 604). For example, the optimizer module may receive a weather forecast from a weather source and/or an ECM of a PV energy resource, as described above.

As further shown in FIG. 6, process 600 may include determining a first supply of power available from a photo voltaic (PV) installation for the time period based on the weather forecast (block 606). For example, the optimizer module may determine a first supply of power available from a PV energy resource for the time period based on the weather forecast, as described above.

In some implementations, the power control system may obtain a plurality of historical weather data (e.g., weather forecasts for previous time periods). The power control system may generate a model for determining the first supply of power and may process, using the model, the historical weather data to determine the first supply of power.

In some implementations, the power control system may perform a training operation when generating the model. The power control system may portion the historical weather data into a training set, a validation set, and a test set and may use the training set to fit the model, use the validation set to provide an evaluation of a fit of the model, and may use the test set to provide an evaluation of the model on the training set.

As further shown in FIG. 6, process 600 may include determining a power deficit for the time period based on the power demand and the first supply of power (block 608). For example, the optimizer module may determine a power deficit for the time period based on the power demand and a supply of power available to be provided by the PV energy resource, as described above.

As further shown in FIG. 6, process 600 may include determining a first cost associated with utilizing a second power supply of power available from a battery for the time period (block 610). For example, the optimizer module may determine a battery cost associated with utilizing the battery to supply sufficient energy to satisfy the power deficit, as described above.

As further shown in FIG. 6, process 600 may include determining a second cost associated with utilizing a third supply of power available from an engine for the time period (block 612). For example, the optimizer module may determine an engine cost associated with utilizing the engine to supply sufficient energy to satisfy the power deficit, as described above.

As further shown in FIG. 6, process 600 may include determining a power source to overcome the power deficit based on the first cost and the second cost (block 614). For example, the optimizer module may determine a power source to overcome the power deficit based on the first cost and the second cost. The power source includes at least one of the battery or the engine, as described above.

As further shown in FIG. 6, process 600 may include sending a request to the PV installation and the power source to cause the PV installation and the power source to supply power to satisfy the power demand for the load (block 616). For example, a supervisor module of the power control system may transmit control information to the PV energy resource and at least one of the battery or the engine to cause the PV energy resource and at least one of the battery or the engine to supply power to satisfy the power demand for the load during the time period specified in the load profile, as described above.

Process 600 may include additional implementations, such as any single implementation or any combination of implementations described above and/or in connection with one or more other processes described elsewhere herein.

Figure 7:
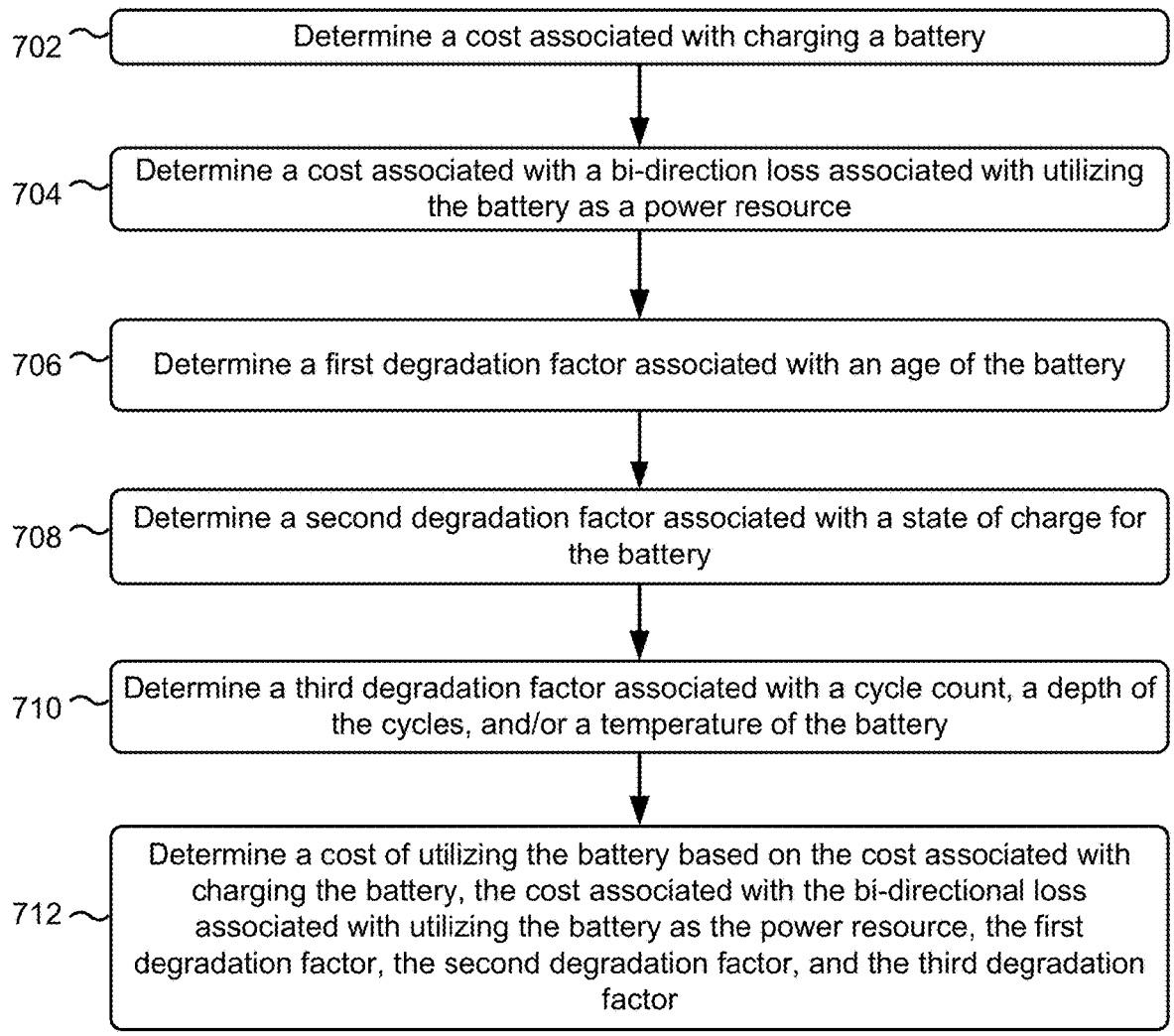
FIG. 7 is a flow chart of an example process for determining a cost of utilizing a battery to supply power.

FIG. 7 is a flow chart of an example process 700 for determining a cost of utilizing a battery to supply power. One or more process blocks of FIG. 7 may be performed by the power control system 104. Additionally, or alternatively, one or more process blocks of FIG. 7 may be performed by another device or a group of devices separate from or including the power control system 104, such as the ECM of the PV energy resource 106, the ECM of the engine 108, and/or the ECM of the battery 110.

As shown in FIG. 7, process 700 may include determining a cost associated with charging a battery (block 702). For example, the power control system may determine a cost associated with charging the battery, as described above.

As further shown in FIG. 7, process 700 may include determining a cost associated with a bi-directional loss associated with utilizing the battery as a power source (block 704). For example, the power control system may determine a cost associated with a bi-directional loss associated with utilizing the battery as a power source, as described above.

As further shown in FIG. 7, process 700 may include determining a first degradation factor associated with an age of the battery (block 706). For example, the power control system may determine a first degradation factor associated with an age of the battery, as described above.

As further shown in FIG. 7, process 700 may include determining a second degradation factor associated with a state of charge of the battery (block 708). For example, the power control system may determine a second degradation factor associated with a state of charge of the battery, as described above.

As further shown in FIG. 7, process 700 may include determining a third degradation factor associated with a cycle count, a depth of the cycles, and/or a temperature of the battery (block 710). For example, the power control system may determine a third degradation factor associated with a cycle count, a depth of the cycles, and/or a temperature of the battery, as described above.

As further shown in FIG. 7, process 700 may include determining a cost of utilizing the battery based on the cost associated with charging the battery, the cost associated with the bi-directional loss associated with utilizing the battery as the power resource, the first degradation factor, the second degradation factor, and the third degradation factor (block 712). For example, the power control system may determine a cost of utilizing the battery based on the cost associated with charging the battery, the cost associated with the bi-directional loss associated with utilizing the battery as the power resource, the first degradation factor, the second degradation factor, and the third degradation factor, as described above.

Process 700 may include additional implementations, such as any single implementation or any combination of implementations described above and/or in connection with one or more other processes described elsewhere herein.

Figure 8:
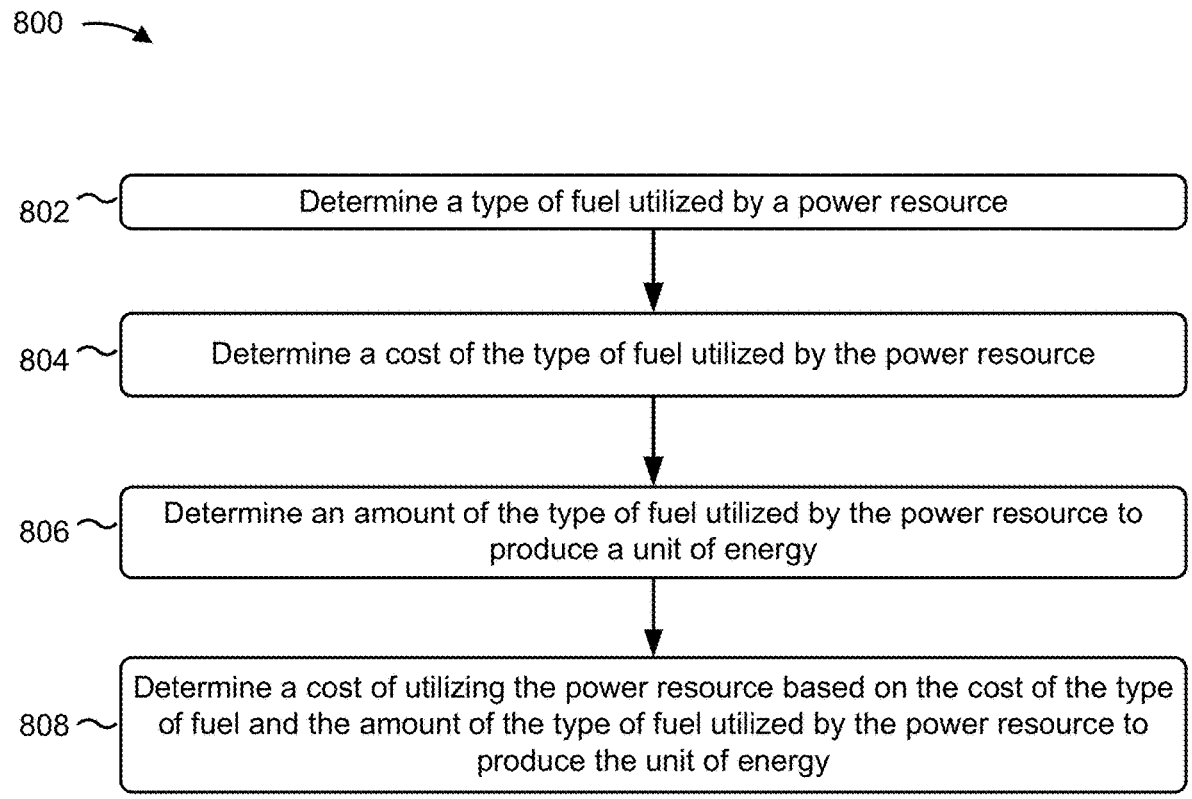
FIG. 8 is a flow chart of an example process for determining a cost of utilizing a power resource to supply power.

FIG. 8 is a flow chart of an example process 800 for determining a cost of utilizing power resource to supply power. One or more process blocks of FIG. 8 may be performed by the power control system 104. Additionally, or alternatively, one or more process blocks of FIG. 8 may be performed by another device or a group of devices separate from or including the power control system 104, such as the ECM of the PV energy resource 106, the ECM of the engine 108, and/or the ECM of the battery 110.

As shown in FIG. 8, process 800 may include determining a type of fuel utilized by a power resource (block 802). For example, the power control system may determine a type of fuel utilized by an engine, as described above.

As further shown in FIG. 8, process 800 may include determining a cost of the type of fuel utilized by the power resource (block 804). For example, the power control system may determine a cost of the type of fuel utilized by an engine, as described above.

As further shown in FIG. 8, process 800 may include determining an amount of the type of fuel utilized by the power resource to produce a unit of energy (block 806). For example, the power control system may determine an amount of the type of fuel utilized by an engine to produce a unit of energy, as described above.

As further shown in FIG. 8, process 800 may include determining a cost of utilizing the power resource based on the cost of the type of fuel and the amount of the type of fuel utilized by the power resource to produce the unit of energy (block 808). For example, the power control system may determine a cost of utilizing an engine based on the cost of the type of fuel and the amount of the type of fuel utilized by the engine to produce the unit of energy, as described above.

Process 800 may include additional implementations, such as any single implementation or any combination of implementations described above and/or in connection with one or more other processes described elsewhere herein.

Figure 9:
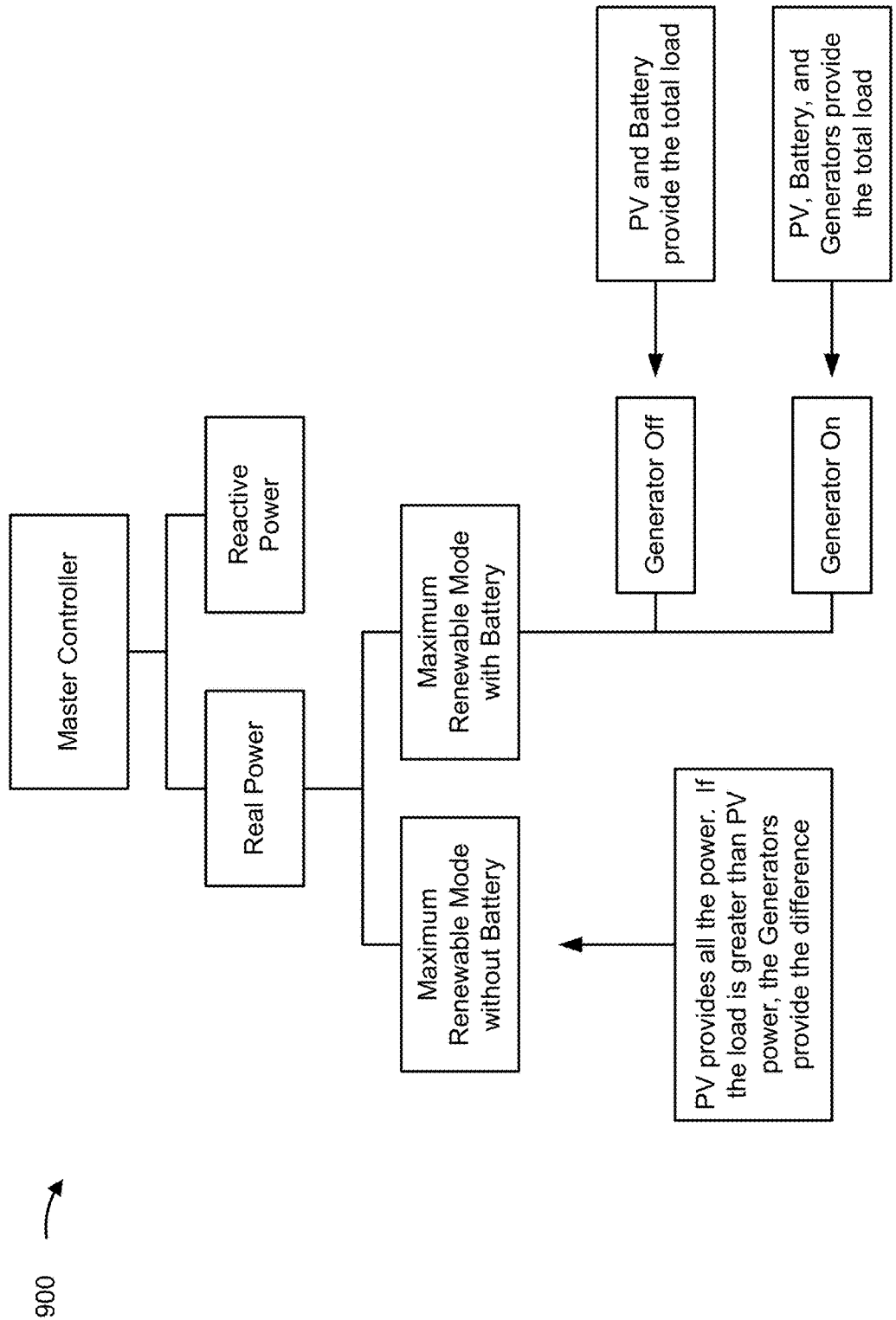
FIG. 9 is a diagram of an example process for controlling multiple power resources.
Figure 10:
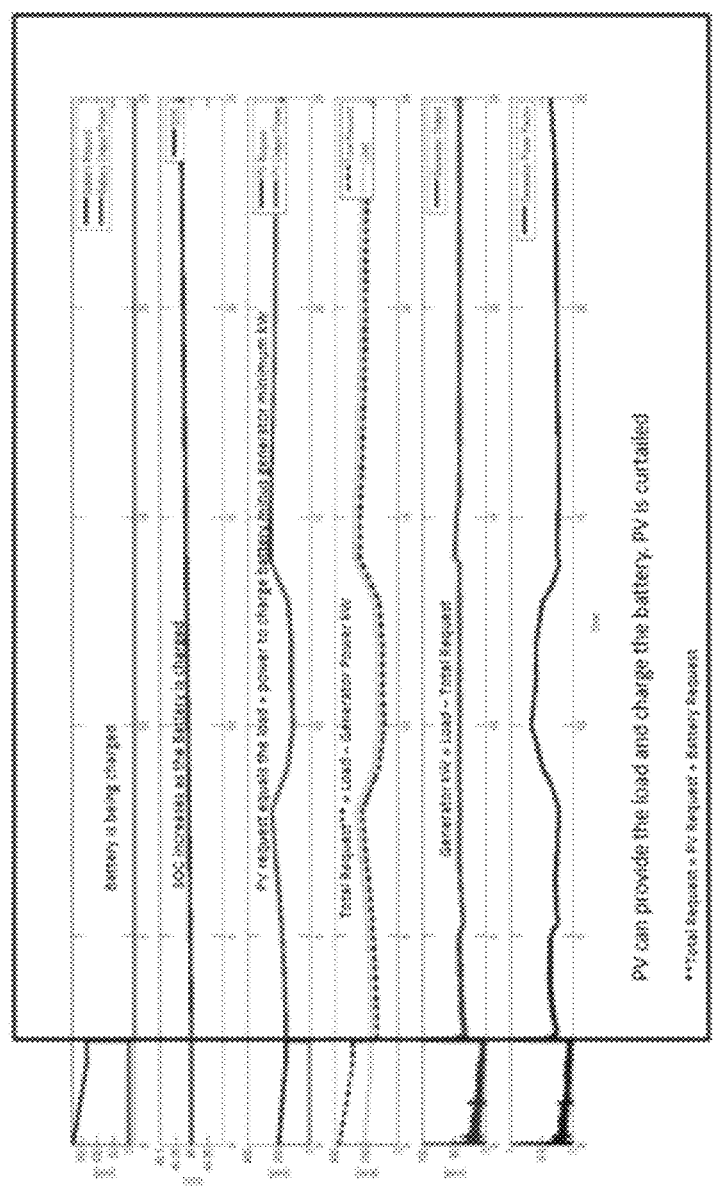
FIG. 10 is an energy diagram for multiple power resources.

FIG. 9 is a diagram of an example process 900 for controlling multiple power resources. A master controller (e.g., the power control system 104) may receive a load profile indicating a power demand, in a manner similar to that described above with respect to FIG. 1. As shown in FIG. 9, the master controller determines an amount of real power and an amount of reactive power available from a plurality of power resources (e.g., the PV energy resource 106, the engine 108, and/or the battery 110). In some implementations, the master controller determines the amount of real power based on an energy diagram, such as an energy diagram for multiple power resources, as shown in FIG. 10. FIG. 10 depicts an example application where the PV energy resource 106 can provide power for the requested load and for charging the battery and can be curtailed in the event there is excess energy.

In some implementations, the master controller may determine that an amount of energy associated with a PV energy resource is sufficient to satisfy the power demand, in a manner similar to that described above with respect to FIG. 1. In these implementations, the master controller may enter a maximum renewable mode without battery. In the maximum renewable mode without battery, the master controller causes only power provided by the PV energy resource to be provided to a load, in a manner similar to that described above with respect to FIG. 1.

In some implementations, the master controller may determine that an amount of energy associated with the PV energy resource is insufficient to satisfy the power demand. In these implementations, the master controller may enter a maximum renewable mode with battery. In the maximum renewable mode with battery, the master controller determines to utilize the PV energy resource and at least one of the battery or the engine to provide power to the load, in a manner similar to that described above with respect to FIG. 1.

As indicated above, FIG. 9 is provided as an example. Other examples may differ from what is described in connection with FIG. 9.

INDUSTRIAL APPLICABILITY

A micro-grid site utilizes a plurality of power resources to provide energy to a load. For example, the micro-grid site may include a photo-voltaic (PV) installation, a battery, and/or an engine configured to provide electrical energy to a load. An optimization scheme associated with the power resources may be used to determine a most cost-effective energy output associated with the plurality of power resources.

However, the supply of available energy from the PV installation may be dependent on a current weather condition. While the optimization scheme may use the current weather condition to determine a most cost-effective energy output associated with the plurality of power resources, the optimization scheme may fail to consider future weather conditions and the effect that the future weather condition may have on the supply of available energy from the PV installation. By failing to consider future weather conditions and the effect that the future weather conditions may have on the supply of available energy from the PV installation, the optimization scheme may fail to minimize an overall cost associated with the energy output of the plurality of power resources.

Figure 11:
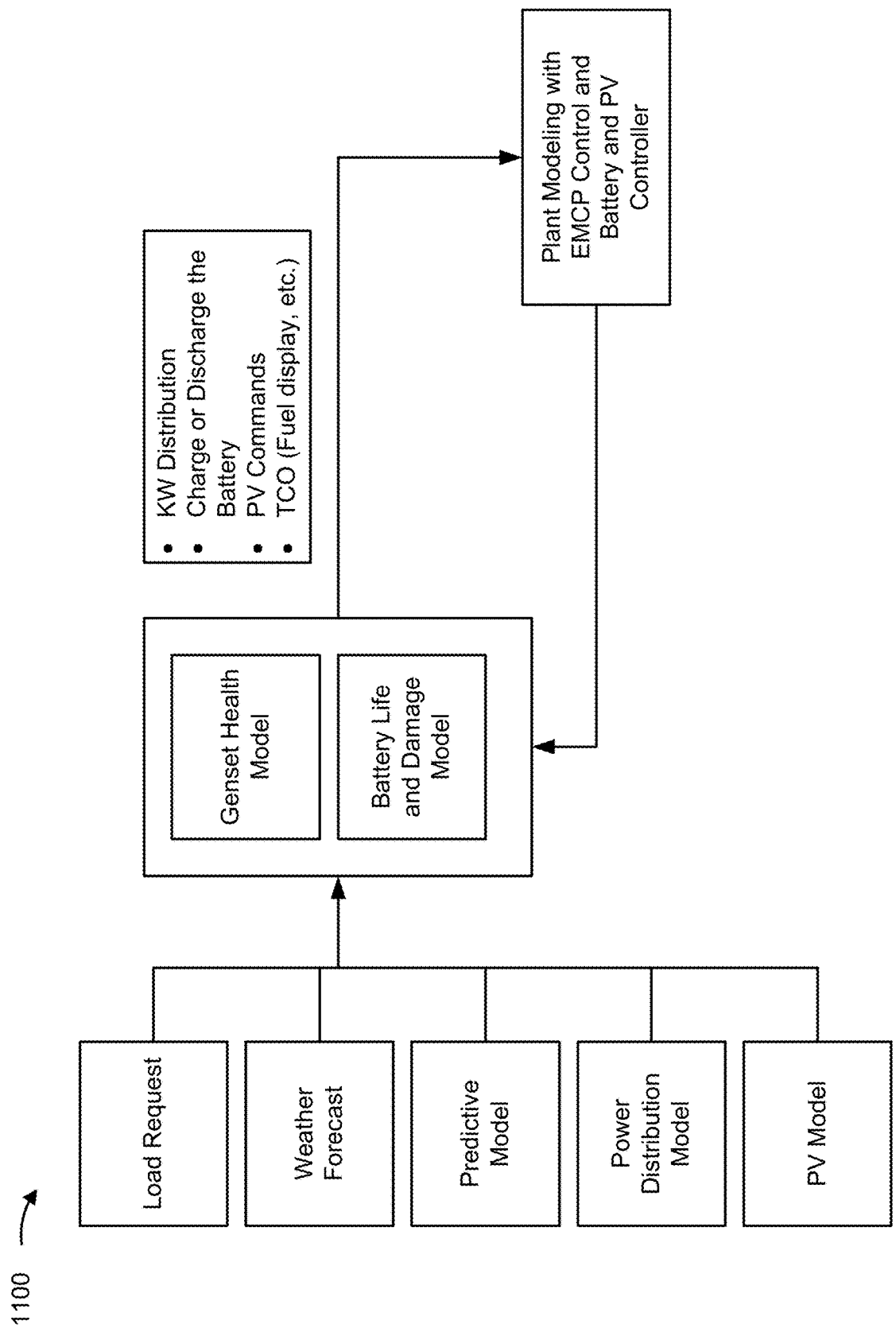
FIG. 11 is a diagram of an example power generation system described herein.

As shown in FIG. 11, a power control system utilizes machine learning to determine an optimization scheme that minimizes an overall cost associated with the energy output of the plurality of power resources. For example, upon receiving a load request (e.g., a load profile), the power control system obtains weather information (e.g., a weather forecast) and provides the weather information for a future time period as an input to a PV model (e.g., PV energy prediction model). The PV model outputs an amount of energy available from a PV energy resource during a time period, as described herein.

A genset health model receives, as inputs, engine information associated with one or more engines included in the micro-grid site and outputs engine cost information. A battery life and damage model receives, as inputs, battery information associated with one or more batteries included in the micro-grid site and outputs battery cost information. A predictive model (e.g., the load profile prediction model) receives, as inputs, historical load profiles and outputs a predicted load profile, as described herein. The power control system inputs the amount of energy available from the PV energy resource, the engine cost information, the battery cost information, and the predicted load profile into a power distribution model to determine a power supply plan for supplying energy to the load.

Because the power control system considers future weather conditions and the effect that the future weather conditions may have on the supply of available energy from the PV installation, the optimization scheme minimizes an overall cost associated with the energy output of the plurality of power resources.

As used herein, the articles "a" and "an" are intended to include one or more items and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, by an optimizer of a power control system, a power demand;
   receiving, by the optimizer, a first weather forecast for a first time period and a second weather forecast for second time period,
      wherein the second time period is different from the first time period;
   determining, by the optimizer, a first power supply available from a first power resource, of a plurality of power resources, over the first time period based on the first weather forecast and a second power supply available from the first power resource over the second time period based on the second weather forecast;
   determining, by the optimizer, a power deficit for the time period based on the power demand and the first power supply;
   determining, by the optimizer, a cost associated with utilizing a third power supply from a second power resource, of the plurality of power resources, over the first time period;
   selecting, by the optimizer, one or more of the second power resource or a third power resource, as a selected power source, based on the cost associated with utilizing the third power supply; and
   sending, by the power control system, a request to the first power resource and the selected power source to cause the first power source and the selected power source to supply power to satisfy the power demand.

2. The method of claim 1, wherein determining the first power supply includes:
   utilizing machine learning to determine the first power supply.

3. The method of claim 1, wherein determining the first power supply includes:
   obtaining historical weather data;
   generating a model for determining the first power supply; and
   processing, using the model, the historical weather data to determine the first power supply.

4. The method of claim 3, further comprising:
   performing a training operation when generating the model by partitioning the historical weather data into a training set, a validation set, and a test set,
      wherein performing the training operation comprises:
         using the training set to fit the model,
         using the validation set to provide an evaluation of a fit of the model, and
         using the test set to provide an evaluation of the model on the training set.

5. The method of claim 1, wherein determining the cost associated with utilizing the third power supply includes at least one of:
  determining a cost associated with charging a battery; or
  determining a cost associated with a bi-directional loss associated with utilizing the battery as a power resource.

6. The method of claim 1, wherein determining the cost associated with utilizing the third power supply includes at least one of:
  determining a first degradation factor associated with an age of a battery;
  determining a second degradation factor associated with a state of charge for the battery; or
  determining a third degradation factor associated with a cycle count associated with the battery.

7. The method of claim 1, wherein determining the cost associated with utilizing the third power supply includes:
  determining a cost of a type of fuel utilized by an engine.

8. A device, comprising:
  one or more memories; and
  one or more processors, communicatively coupled to the one or more memories, configured to:
    receive a power demand for a load;
    receive a first weather forecast for a first time period and a second weather forecast for second time period,
      wherein the second time period is different from the first time period;
    determine a first power supply available from a first power resource, of a plurality of power resources, over the first time period based on the first weather forecast and a second power supply available from the first power resource over the second time period based on the second weather forecast;
    determine a power deficit for the time period based on the power demand and the first power supply;
    determine a cost associated with utilizing a third power supply from a second power resource, of the plurality of power resources, over the first time period;
    determine a selected power source to overcome the power deficit by selecting one or more of the second power resource or a third power resource as the selected power source based on the cost associated with utilizing the third power supply,
      wherein the selected power source includes at least one of a battery or an engine; and
    send a request to the first power resource and the selected power source to cause the first power source and the selected power source to supply power to satisfy the power demand for the load.

9. The device of claim 8, wherein, when determining the selected power source, the one or more processors are configured to:
  utilize machine learning to determine the selected power source.

10. The device of claim 8, wherein, when determining the selected power source, the one or more processors are configured to:
  obtain a plurality of historical load profiles;
  generate a model for determining the selected power source;
  process, using the model, the historical load profiles to determine a predicted load profile; and
  determine the selected power source further based on the predicted load profile.

11. The device of claim 10, wherein the one or more processors are further configured to:
  perform a training operation when generating the model by partitioning the historical load profiles into a training set, a validation set, and a test set,
    wherein the one or more processors, when perform the training operation, are configured to:
      use the training set to fit the model,
      use the validation set to provide an evaluation of a fit of the model, and
      use the test set to provide an evaluation of the model on the training set.

12. The device of claim 8, wherein, when determining the cost associated with utilizing the third power supply, the one or more processors are configured to at least one of:
  determine a cost associated with charging the battery; or
  determine a cost associated with a bi-directional loss associated with utilizing the battery as a power resource.

13. The device of claim 8, wherein, when determining the cost associated with utilizing the third power supply, the one or more processors are configured to at least one of:
  determine a first degradation factor associated with an age of the battery;
  determine a second degradation factor associated with a state of charge for the battery; or
  determine a third degradation factor associated with a cycle count associated with the battery.

14. The device of claim 8, wherein, when determining the cost associated with utilizing the third power supply, the one or more processors are configured to:
  determine a cost of a type of fuel utilized by the engine.

15. A system comprising:
  a plurality of power resources; and
  a power control device configured to:
    receive a power demand;
    receive a first weather forecast for a first time period and a second weather forecast for second time period,
      wherein the second time period is after the first time period;
    determine a first power supply available from a first power resource, of the plurality of power resources, over the first time period based on the first weather forecast and a second power supply available from the first power resource over the second time period based on the second weather forecast;
    determine a power deficit for the first time period based on the power demand and the first power supply;
    determine a cost associated with utilizing a third power supply from a second power resource, of the plurality of power resources, over the first time period;
    determine a cost associated with utilizing a fourth power supply from a third power resource, of the plurality of power resources, over the first time period;
    select one or more of the second power resource or the third power resource, as a selected power source, to satisfy the power deficit based on the second power supply, the cost associated with utilizing the third power supply, and the cost associated with utilizing the fourth power supply; and
    transmit a request to the first power resource and the selected power resource to cause the first power resource and the selected power resource to supply power to satisfy the power demand.

16. The system of claim 15, wherein, when determining the first power supply, the power control device is configured further to:

utilize machine learning to determine the first power supply.

17. The system of claim 15, wherein, when determining the first power supply, the power control device is configured further to:

obtain a plurality of historical weather data;

generate a model for determining the first power supply; and process, using the model, the historical weather data to determine the first power supply.

18. The system of claim 17, wherein the power control device is configured further to:

perform a training operation when generating the model by portioning the historical weather data into a training set, a validation set, and a test set, wherein when performing the training operation, the power control device is configured further to:

use the training set to fit the model, use the validation set to provide an evaluation of a fit of the model, and use the test set to provide an evaluation of the model on the training set.

19. The system of claim 15, wherein, when determining the cost associated with utilizing the second power resource, the power control device is configured to determine at least one of:

a cost associated with charging a battery; or a cost associated with a bi-directional loss associated with utilizing the battery as a power resource.

20. The system of claim 15, wherein, when determining the cost associated with utilizing the second power resource, the power control device is configured to determine at least one of:

a first degradation factor associated with an age of a battery;

a second degradation factor associated with a state of charge for the battery; or a third degradation factor associated with a depth of a cycle associated with the battery.

* * * * *